United States Patent
Liang et al.

(10) Patent No.: US 12,118,455 B2
(45) Date of Patent: Oct. 15, 2024

(54) SYSTEMS, METHODS, AND/OR MEDIA, FOR SELECTING CANDIDATES FOR ANNOTATION FOR USE IN TRAINING A CLASSIFIER

(71) Applicant: ARIZONA BOARD OF REGENTS ON BEHALF OF ARIZONA STATE UNIVERSITY, Scottsdale, AZ (US)

(72) Inventors: Jianming Liang, Scottsdale, AZ (US); Zongwei Zhou, Tempe, AZ (US); Jae Shin, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 1350 days.

(21) Appl. No.: 15/965,691

(22) Filed: Apr. 27, 2018

(65) Prior Publication Data
US 2018/0314943 A1    Nov. 1, 2018

Related U.S. Application Data

(60) Provisional application No. 62/663,931, filed on Apr. 27, 2018, provisional application No. 62/491,069, filed on Apr. 27, 2017.

(51) Int. Cl.
G06N 3/08      (2023.01)
G06F 18/21     (2023.01)
(Continued)

(52) U.S. Cl.
CPC .......... *G06N 3/08* (2013.01); *G06F 18/2148* (2023.01); *G06F 18/217* (2023.01);
(Continued)

(58) Field of Classification Search
CPC ...... G06N 3/08; G06N 3/0454; G06N 3/0472; G06V 10/454; G06K 9/6255; G06K 9/6257; G06K 9/6262; G06K 9/627
See application file for complete search history.

(56) References Cited

U.S. PATENT DOCUMENTS 9,152,926 B2   10/2015 Liang et al.
9,330,336 B2    5/2016 Tajbakhsh et al.
(Continued)

FOREIGN PATENT DOCUMENTS

WO    2012109670 A1    8/2012
WO    2012109676 A1    8/2012
(Continued)

OTHER PUBLICATIONS

Yan ("Multi-Instance Deep Learning: Discover Discriminative Local Anatomies for Bodypart Recognition") IEEE Transactions on Medical Imaging, vol. 35, No. 5, May 2016 (Year: 2016).*
(Continued)

*Primary Examiner* — Kakali Chaki
*Assistant Examiner* — Su-Ting Chuang
(74) *Attorney, Agent, or Firm* — Elliott, Ostrander & Preston, P.C.

(57) ABSTRACT

Systems for selecting candidates for labelling and use in training a convolutional neural network (CNN) are provided, the systems comprising: a memory device; and at least one hardware processor configured to: receive a plurality of input candidates, wherein each candidate includes a plurality of identically labelled patches; and for each of the plurality of candidates: determine a plurality of probabilities, each of the plurality of probabilities being a probability that a unique patch of the plurality of identically labelled patches of the candidate corresponds to a label using a pre-trained CNN; identify a subset of candidates of the
(Continued)

plurality of input candidates, wherein the subset does not include all of the plurality of candidates, based on the determined probabilities; query an external source to label the subset of candidates to produce labelled candidates; and train the pre-trained CNN using the labelled candidates.

20 Claims, 16 Drawing Sheets

(51) Int. Cl.
| | |
|---|---|
| G06F 18/214 | (2023.01) |
| G06F 18/2413 | (2023.01) |
| G06F 18/28 | (2023.01) |
| G06N 3/045 | (2023.01) |
| G06N 3/047 | (2023.01) |
| G06V 10/44 | (2022.01) |
| G06V 10/764 | (2022.01) |
| G06V 10/772 | (2022.01) |
| G06V 10/774 | (2022.01) |
| G06V 10/776 | (2022.01) |
| G06V 10/82 | (2022.01) |

(52) U.S. Cl.
CPC .......... *G06F 18/2413* (2023.01); *G06F 18/28* (2023.01); *G06N 3/045* (2023.01); *G06N 3/047* (2023.01); *G06V 10/454* (2022.01); *G06V 10/764* (2022.01); *G06V 10/772* (2022.01); *G06V 10/7747* (2022.01); *G06V 10/776* (2022.01); *G06V 10/82* (2022.01)

(56) References Cited

U.S. PATENT DOCUMENTS

| | | | |
|---|---|---|---|
| 9,449,381 | B2 | 9/2016 | Liang |
| 9,603,554 | B2 | 3/2017 | Liang et al. |
| 9,684,957 | B2 | 6/2017 | Wu et al. |
| 9,700,213 | B2 | 7/2017 | Tajbakhsh et al. |
| 9,741,116 | B2 | 8/2017 | Liang et al. |
| 9,747,687 | B2 | 8/2017 | Tajbakhsh et al. |
| 9,924,927 | B2 | 3/2018 | Shin et al. |
| 9,959,615 | B2 | 5/2018 | Liang et al. |
| 9,978,142 | B2 | 5/2018 | Chi et al. |
| 10,052,027 | B2 | 8/2018 | Tajbakhsh et al. |
| 10,055,843 | B2 | 8/2018 | Tajbakhsh et al. |
| 10,120,980 | B2 | 11/2018 | Liang |
| 10,157,045 | B2 | 12/2018 | Venkataramani et al. |
| 10,157,467 | B2 | 12/2018 | Dincer et al. |
| 10,328,282 | B2 | 6/2019 | An et al. |
| 10,610,203 | B2 | 4/2020 | Liang et al. |
| 10,861,151 | B2 | 12/2020 | Liang et al. |
| 10,956,785 | B2 | 3/2021 | Liang et al. |
| 11,436,725 | B2 | 9/2022 | Taher et al. |
| 2008/0082468 | A1 | 4/2008 | Long et al. |
| 2014/0135627 | A1 | 5/2014 | Liang et al. |
| 2017/0083792 | A1 | 3/2017 | Rodriguez-Serrano et al. |
| 2017/0099200 | A1 | 4/2017 | Ellenbogen et al. |
| 2017/0124701 | A1 | 5/2017 | Liang et al. |
| 2017/0337682 | A1 | 11/2017 | Liao et al. |
| 2018/0144241 | A1 | 5/2018 | Liu et al. |
| 2018/0144243 | A1 | 5/2018 | Hsieh et al. |
| 2018/0189229 | A1 | 7/2018 | Desoli et al. |
| 2018/0225820 | A1 | 8/2018 | Liang et al. |
| 2018/0225823 | A1 | 8/2018 | Zhou et al. |
| 2018/0253866 | A1 | 9/2018 | Jain et al. |
| 2018/0260957 | A1 | 9/2018 | Yang et al. |
| 2018/0293496 | A1 | 10/2018 | Vogels et al. |
| 2018/0293734 | A1 | 10/2018 | Lim et al. |
| 2018/0307947 | A1 | 10/2018 | Choi et al. |
| 2018/0314943 | A1 | 11/2018 | Liang et al. |
| 2019/0021677 | A1 | 1/2019 | Grbic et al. |
| 2019/0065908 | A1 | 2/2019 | Lee et al. |
| 2019/0130110 | A1 | 5/2019 | Lee et al. |
| 2019/0223738 | A1 | 7/2019 | Böscke et al. |
| 2019/0244348 | A1 | 8/2019 | Buckler et al. |
| 2019/0325621 | A1 | 10/2019 | Wang et al. |
| 2019/0332896 | A1 | 10/2019 | Liang et al. |
| 2020/0074271 | A1 | 3/2020 | Liang et al. |
| 2020/0074701 | A1 | 3/2020 | Liang et al. |
| 2020/0134461 | A1 | 4/2020 | Chai et al. |
| 2020/0175352 | A1 | 6/2020 | Cha et al. |
| 2020/0272864 | A1 | 8/2020 | Faust et al. |
| 2020/0327162 | A1 | 10/2020 | Pevtsov et al. |
| 2020/0364477 | A1 | 11/2020 | Siddiquee et al. |
| 2020/0380695 | A1 | 12/2020 | Zhou et al. |
| 2021/0150710 | A1 | 5/2021 | Taher et al. |

FOREIGN PATENT DOCUMENTS

| | | | |
|---|---|---|---|
| WO | 2013116865 | A1 | 8/2013 |
| WO | 2013116867 | A1 | 8/2013 |
| WO | 2015031641 | A1 | 3/2015 |
| WO | 2015113014 | A1 | 7/2015 |
| WO | 2015142808 | A1 | 9/2015 |
| WO | 2015164724 | A1 | 10/2015 |
| WO | 2015164768 | A1 | 10/2015 |
| WO | 2016161115 | A1 | 10/2016 |
| WO | 2017027475 | A1 | 2/2017 |
| WO | 2018232388 | A1 | 12/2018 |
| WO | 2019019199 | A1 | 1/2019 |

OTHER PUBLICATIONS

Maggiori ("Convolutional Neural Networks for Large-Scale Remote-Sensing Image Classification") IEEE Transactions on Geoscience and Remote Sensing, vol. 55, No. 2, Feb. 2017 (Year: 2017).*
Chakraborty ("Active Batch Selection via Convex Relaxations with Guaranteed Solution Bounds") IEEE Transactions on Pattern Analysis and Machine Intelligence, vol. 37, No. 10, Oct. 2015 (Year: 2015).*
Montenegro ("A framework for interactive training of automatic image analysis models based on learned image representations, active learning and visualization techniques"). Universidad Nacional de Colombia Engineering School, Systems and Industrial Engineering Department Bogotá D.C., Colombia (Year: 2016).*
Grinsven ("Fast Convolutional Neural Network Training Using Selective Data Sampling: Application to Hemorrhage Detection in Color Fundus Images") IEEE Transactions on Medical Imaging, vol. 35, No. 5, May 2016 (Year: 2016).*
Oliveira ("A Data Augmentation Methodology to Improve Age Estimation Using Convolutional Neural Networks") 2016 29th SIBGRAPI Conference on Graphics, Patterns and Images (Year: 2016).*
Liu ("Fully Convolutional Attention Networks for Fine-Grained Recognition") arXiv:1603.06765v4 [cs.CV] Mar. 21, 2017 (Year: 2017).*
Tajbakhsh ("Convolutional Neural Networks for Medical Image Analysis: Full Training or Fine Tuning?") IEEE Transactions on Medical Imaging, vol. 35, No. 5, May 2016 (Year: 2016).*
Li ("A high accuracy automatic timing method for photo finish systems") 2014 IEEE International Conference on Progress in Informatics and Computing (Year: 2014).*
Shin ("Automating Carotid Intima-Media Thickness Video Interpretation with Convolutional Neural Networks") 2016 IEEE Conference on Computer Vision and Pattern Recognition (Year: 2016).*
Settles, B., "Active Learning Literature Survey", Computer Sciences Technical Report: University of Wisconsin-Madison, 2010, vol. 52, No. 55-56, 67 pages.
Shannon, C., "A Mathematical Theory of Communication", The Bell System Technical Journal, Oct. 1948, vol. 27, No. 3, pp. 379-423.
Shelhamer, E. et al., "Fully Convolutional Networks for Semantic Segmentation", IEEE Transactions on Pattern Analysis and Machine Intelligence, Apr. 2017 (Date of Publication: May 24, 2016), vol. 39, No. 4, pp. 640-651 <DOI:10.1109/TPAMI.2016.2572683>.
Shin, H-C. et al., "Deep Convolutional Neural Networks for Computer-Aided Detection: CNN Architectures, Dataset Characteristics and

(56) References Cited

OTHER PUBLICATIONS

Transfer Learning", IEEE Transactions on Medical Imaging, May 2016 (date of publication Feb. 2016), vol. 35, No. 5, pp. 1285-1298 <DOI:10.1109/TMI.2016.2528162>.
Shin, H-C. et al., "Interleaved text/image Deep Mining on a large-scale radiology database", IEEE Conference on Computer Vision and Pattern Recognition (Boston, MA, Jun. 7-12, 2015), 2015, pp. 1090-1099 <DOI:10.1109/CVPR.2015.7298712>.
Shin, J. et al., "Automating Carotid Intima-Media Thickness Video Interpretation with Convolutional Neural Networks", IEEE Conference on Computer Vision and Pattern Recognition (Las Vegas, NV, Jun. 27-30, 2016), 2016 (date added to IEEE Xplore Dec. 2016), pp. 2526-2535 <DOI:10.1109/CVPR.2016.277>.
Simonyan, K. et al., "Very deep convolutional networks for large-scale image recognition", arXiv, Published as a conference paper at ICLR 2015, 2014, 14 pages.
Stark, F. et al., "CAPTCHA recognition with active deep learning", Citeseer, Sep. 2015, 8 pages.
Stein, J. et al., "Use of Carotid Ultrasound to Identify Subclinical Vascular Disease and Evaluate Cardiovascular Disease Risk: A Consensus Statement from the American Society of Echocardiography Carotid Intima-Media Thickness Task Force Endorsed by the Society for Vascular Medicine", Journal of the American Society of Echocardiography, 2008, vol. 21, No. 2, pp. 93-111 <DOI:10.1016/j.echo.2007.11.011>.
Szegedy, C. et al., "Going deeper with convolutions", IEEE Conference on Computer Vision and Pattern Recognition (Boston, MA, Jun. 7-12, 2015), Date Added to IEEE Xplore: Oct. 2015 <DOI:10.1109/CVPR.2015.7298594>.
Tajbakhsh, N. et al., "Chapter 5—Automatic Interpretation of Carotid Intima-Media Thickness Videos Using Convolutional Neural Networks", Deep Learning for Medical Image Analysis, Jan. 2017, pp. 105-131 <DOI:10.1016/B978-0-12-810408-8.00007-9>.
Tajbakhsh, N. et al., "Computer-aided pulmonary embolism detection using a novel vessel-aligned multi-planar image representation and convolutional neural networks", International Conference on Medical Image Computing and Computer-Assisted Intervention, Springer, 2015, pp. 62-69 <DOI:10.1007/978-3-319-24571-3_8>.
Tajbakhsh, N. et al., "Convolutional neural networks for medical image analysis: Full training or fine tuning?", May 2016 (Date of Publication: Mar. 7, 2016), vol. 35, No. 5, pp. 1299-1312 <DOI:10.1109/TMI.2016.2535302>.
Van Rijn, J. et al., "Polyp miss rate determined by tandem colonoscopy: a systematic review", American Journal of Gastroenterology, 2006, vol. 101, No. 2, pp. 343-350 <DOI:10.1111/j.1572-0241.2006.00390.x>.
Wang, D. et al., "A new active labeling method for deep learning", International Joint Conference on Neural Networks (Beijing, China, Jul. 6-11, 2014), 2014, pp. 112-119 <DOI:10.1109/IJCNN.2014.6889457>.
Wang, H. et al., "Comparison of machine learning methods for classifying mediastinal lymph node metastasis of non-small cell lung cancer from 18F-FDG PET/CT images", EJNMMI Research, Jan. 2017, vol. 7, No. 11, 11 pages <DOI:10.1186/s13550-017-0260-9>.
Weiss, K. et al., "A survey of transfer learning", Journal of Big Data, May 2016, vol. 3, No. 9, 40 pages <DOI:10.1186/s40537-016-0043-6>.
World Health Organization (WHO)., "Global Atlas on Cardiovascular Disease Prevention and Control", Sep. 2011, 166 pages, available online <URL:https://www.who.int/cardiovascular_diseases/publications/atlas_cvd/en/>.
Yang, L. et al., "Suggestive annotation: A deep active learning framework for biomedical image segmentation", arXiv, Jun. 2017, pp. 399-407.
Yuan, X-T. et al., "Truncated power method for sparse eigenvalue problems", The Journal of Machine Learning Research, Jan. 2013, vol. 14, No. 1, pp. 899-925.
Zhang, J. et al., "Transfer Learning for Cross-Dataset Recognition: A Survey", 2017, accessed from: https://arxiv.org/abs/1705.04396.

Zhou, B. et al., "Places: A 10 million image database for scene recognition", IEEE Transactions on Pattern Analysis and Machine Intelligence, Jul. 2017, vol. 40, No. 6, pp. 1452-1464 <DOI:10.1109/TPAMI.2017.2723009>.
Zhou, B. et al., "Places: An Image Database for Deep Scene Understanding", arXiv preprint, Oct. 2016, 12 pages, accessed from: arXiv:1610.02055.
Zhou, Z. et al., "AFT*: Integrating Active Learning and Transfer Learning to Reduce Annotation Efforts", arXiv:1802.00912, 2018, 14 pages.
Zhou, Z. et al., "Fine-Tuning Convolutional Neural Networks for Biomedical Image Analysis: Actively and Incrementally", IEEE Conference on Computer Vision and Pattern Recognition (Honolulu, HI, Jul. 21-26, 2017), 2017 (Date Added to IEEE Xplore: Nov. 9, 2017), pp. 4761-4772 <DOI:10.1109/CVPR.2017.506>.
Zhou, Z. et al., "Integrating Active Learning and Transfer Learning for Carotid Intima-Media Thickness Video Interpretation", Journal of Digital Imaging, 2019 (available online Nov. 2018), vol. 32, pp. 290-299 <DOI:10.1007/s10278-018-0143-2>.
Huang, S., "Cost-Effective Training of Deep CNNs with Active Model Adaptation", in: Proceedings of the 24th ACM SIGKDD International Conference on Knowledge Discovery & Data Mining, ACM. Aug. 10-23, 2018pp. 1580-1588.
Lin, L., "Active Self-Paced Learning for Cost-Effective and Progressive Face Identification", IEEE Transactions on Pattern Analysis and Machine Intelligence 40, Jan. 7-19, 2018, pp. 1-13.
Huang, S-J. et al., "Active learning by querying informative and representative examples", International Conference on Neural Information Processing (Vancouver, Canada, Dec. 6-9, 2010), 2010, vol. 1, pp. 9 pages.
Liu, B., "Active learning for human pose estimation", in: Proceedings of the IEEE International Conference on Computer Vision, Oct. 22-29, 2017, pp. 4363-4372.
Xie, S., "Aggregated residual transformations for deep neural networks", in: Proceedings of the IEEE conference on computer vision and pattern recognition, pp. 5987-5995.
Al Rahhal, M. et al., "Deep learning approach for active classification of electrocardiogram signals", Information Sciences, Jun. 2016, vol. 345, pp. 340-354 <DOI:10.1016/j.ins.2016.01.082>.
Borisov, A. et al., "Active Batch Learning with Stochastic Query-by-Forest (SQBF)", JMLR: Workshop and Conference Proceedings, 2010 (published 2011), vol. 16, pp. 59-69.
Calder, K. et al., "The mortality of untreated pulmonary embolism in emergency department patients", Annals of Emergency Medicine, Mar. 2005, vol. 45, No. 3, pp. 302-310 <DOI:10.1016/j.annemergmed.2004.10.001>.
Carneiro, G. et al., "Unregistered multiview mammogram analysis with pre-trained deep learning models", Medical Image Computing and Computer-Assisted Intervention—MICCAI (Munich, Germany, Oct. 5-9, 2015), 2015, vol. 9351, pp. 652-660 <DOI:10.1007/978-3-319-24574-4 78>.
Chakraborty, S. et al., "Active Batch Selection via Convex Relaxations with Guaranteed Solution Bounds", IEEE Transactions on Pattern Analysis and Machine Intelligence, Oct. 2015 (Date of Publication: Jan. 12, 2015), vol. 37, No. 10, pp. 1945-1958 <DOI:10.1109/TPAMI.2015.2389848>.
Chattopadhyay, R. et al., "Joint transfer and batch-mode active learning", International Conference on Machine Learning (Atlanta, GA, Jun. 16-21, 2013), 2013, pp. 253-261.
Chen, H. et al., "Automatic fetal ultrasound standard plane detection using knowledge transferred recurrent neural hetworks", Medical Image Computing and Computer-Assisted Intervention—MICCAI (Munich, Germany, Oct. 5-9, 2015), 2015, pp. 507-514.
Chen, H. et al., "Standard plane localization in fetal ultrasound via domain transferred deep neural networks", IEEE Journal of Biomedical and Health Informatics, Sep. 2015 (Date of Publication: Apr. 21, 2015), vol. 19, No. 5, pp. 1627-1636 <DOI:10.1109/JBHI.2015.2425041>.
D'Agostino, R. et al., "General Cardiovascular Risk Profile for use in Primary Care", Circulation, Feb. 2008 (available online Jan. 2008), vol. 117, No. 6, pp. 743-753 <DOI:10.1161/CIRCULATIONAHA.107.699579>.

(56) References Cited

OTHER PUBLICATIONS

Delsanto, S. et al., "Characterization of a Completely User-Independent Algorithm for Carotid Artery Segmentation in 2-D Ultrasound Images", IEEE Transactions on Instrumentation and Measurement, Aug. 2007 (date of publication Jul. 2007), vol. 56, No. 4, pp. 1265-1274 <DOI:10.1109/TIM.2007.900433>.

Deng, J. et al., "Imagenet: A large-scale hierarchical image database", IEEE Conference on Computer Vision and Pattern Recognition (Miami, FL, Jun. 20-25, 2009), 2009, pp. 248-255 <DOI:10.1109/CVPR.2009.5206848>.

Feige, U., "A Threshold of In n for Approximating Set Cover", Journal of the ACM, Jul. 1998, vol. 45, No. 4, pp. 634-652 <DOI:10.1145/285055.285059>.

Gao, M. et al., "Holistic classification of ct attenuation patterns for interstitial lung diseases via deep convolutional neural networks", Computer Methods in Biomechamics and Biomedical Engineering. Imaging & Visualization, 2015 (available online Jun. 2016), vol. 6, No. 1, pp. 1-6 <DOI:10.1080/21681163.2015.1124249>.

Gepner, A. et al., "Comparison of Coronary Artery Calcium Presence, Carotid Plaque Presence, and Carotid Intima-Media Thickness for Cardiovascular Disease Prediction in the Multi-Ethnic Study of Atherosclerosis", Circulation, Jan. 2015, vol. 8, No. 1, pp. 1-8 <DOI:10.1161/CIRCIMAGING.114.002262>.

Greenspan, H. et al., "Guest Editorial Deep Learning in Medical Imaging: Overview and Future Promise of an Exciting New Technique", May 2016 (Date of Publication: Apr. 29, 2016), vol. 35, No. 5, pp. 1153-1159 <DOI:10.1109/TMI.2016.2553401>.

Gunn, S. et al., "Support Vector Machines for Classification and Regression", ISIS Technical Report, May 1998, vol. 14, pp. 85-86.

Guyon, I. et al., "Results of the Active Learning Challenge", JMLR: Workshoup and Conference Proceedings, 2011, vol. 16, pp. 19-45.

He, K. et al., "Deep Residual Learning for Image Recognition", IEEE Conference on Computer Vision and Pattern Recognition, Jun. 2016, pp. 770-778 <DOI:10.1109/CVPR.2016.90>.

Heresbach, D. et al., "Miss rate for colorectal neoplastic polyps: a prospective multicenter study of back-to-back video colonoscopies", Endoscopy, Apr. 2008, vol. 40, No. 4, pp. 284-290 <DOI:10.1055/s-2007-995618>.

Juang, G. et al., "Densely connected convolutional networks", arXiv preprint, 2016, 9 pages, <accessed from: arXiv:1608.06993>.

Juang, S-J. et al., "Active learning by querying informative and representative examples", International Conference on Neural Information Processing (Vancouver, Canada, Dec. 6-9, 2010), 2010, vol. 1, pp. 9 pages.

Hurst, T. et al., "Incidence of Subclinical Atherosclerosis as a Marker of Cardiovascular Risk in Retired Professional Football Players", The American Journal of Cardiology, Apr. 2010 (available online Feb. 2010), vol. 105, No. 8, pp. 1107-1111 <DOI:10.1016/j.amjcard.2009.12.012>.

Jia, Y. et al., "Caffe: Convolutional Architecture for Fast Feature Embedding", arXiv preprint, 2014, 4 pages, accessed from: arXiv:1408.5093.

Kass, M. et al., "Snakes: Active Contour Models", International Journal of Computer Vision, 1988, vol. 1, No. 4, pp. 321-331.

Kim, D. et al., "CT Colonography versus Colonoscopy for the Detection of Advanced Neoplasia", The New England Journal of Medicine, Oct. 2007, vol. 357, No. 14, pp. 1403-1412 <DOI:10.1056/NEJMoa070543>.

Konyushkova, K. et al., "Learning Active Learning from Data", Advances in Neural Information Processing Systems, 2017, pp. 4226-4236.

Krizhevsky, A. et al., "ImageNet Classification with Deep Convolutional Neural Networks", Advances in Neural Information Processing Systems, 2012, pp. 1097-1105.

Kukar, M. et al., "Transductive reliability estimation for medical diagnosis", Artificial Intelligence in Medicine, Sep.-Oct. 2003, vol. 29, No. 1-2, pp. 81-106 <DOI:10.1016/S0933-3657(03)00043-5>.

Lecun, Y. et al., "Deep learning", Nature, May 2015, vol. 521, No. 7553, pp. 436-444 <DOI:10.1038/nature14539>.

Lecun, Y. et al., "Gradient-based learning applied to document recognition", Proceedings of the IEEE, Nov. 1998, vol. 86, No. 11, pp. 2278-2324 <DOI:10.1109/5.726791>.

Leufkens, A. et al., "Factors influencing the miss rate of polyps in a back-to-back colonoscopy study", Endoscopy, May 2012, vol. 44, No. 5, pp. 470-475 <DOI:10.1055/s-0031-1291666>.

Li, J., "Active learning for hyperspectral image classification with a stacked autoencoders based neural network", IEEE International Conference on Image Processing (Phoenix, AZ, Sep. 25-28, 2016), 2016, pp. 1062-1065 <DOI:10.1109/ICIP.2016.7532520>.

Li, M. et al., "Confidence-based active learning", IEEE Transactions on Pattern Analysis and Machine Intelligence, Aug. 2006 (Date of Publication: Jun. 19, 2006), vol. 28, No. 8, pp. 1251-1261 <DOI:10.1109/TPAMI.2006.156>.

Liang, J. et al., "Computer aided detection of pulmonary embolism with tobogganing and mutiple instance classification in CT pulmonary angiography", International Conference of Information Processing in Medical Imaging (Kerkrade, Netherlands, Jul. 2007), 2007, pp. 630-641.

Liang, J. et al., "United Snakes", Medical Image Analysis, Apr. 2006 (available online Nov. 2005), vol. 10, No. 2, pp. 215-233 <DOI:10.1016/j.media.2005.09.002>.

Liang, Q. et al., "A multiscale dynamic programming procedure for boundary detection in ultrasonic artery images", IEEE Transactions on Medical Imaging, Feb. 2000, vol. 19, No. 2, pp. 127-142 <DOI:10.1109/42.836372>.

Litjens, G. et al., "A survey on deep learning in medical image analysis", Medical Image Analysis, Dec. 2017, vol. 42, pp. 60-88 <DOI:10.1016/j.media.2017.07.005>.

Loizou, C. et al., "An integrated system for the segmentation of atherosclerotic carotid plaque", IEEE Transactions on Information Technology in Biomedicine, Nov. 2007, vol. 11, No. 6, pp. 661-667 <DOI:10.1109/TITB.2006.890019>.

Long, J. et al., "Fully Convolutional Networks for Semantic Segmentation", IEEE Conference on Computer Vision and Pattern Recognition, 2015, pp. 3431-3440.

Lorenz, M. et al., "Prediction of Clinical Cardiovascular Events With Carotid Intima-Media Thickness", Circulation, Jan. 2007, vol. 115, No. 4, pp. 459-467 <DOI:10.1161/CIRCULATIONAHA.106.628875>.

Margeta, J. et al., "Fine-tuned convolutional neural nets for cardiac mri acquisition plane recognition", Computer Methods in Biomechanics and Biomedical Engineering. Imaging & Visualization, Aug. 2015, pp. 1-11 <DOI:10.1080/21681163.2015.1061448>.

Menchon-Lara, R-M. et al., Automatic Evaluation of Carotid Intima-Media Thickness in Ultrasounds Using Machine Learning, International Work-Conference on the Interplay Between Natural and Artifical Computation, 2013, vol. 7931, pp. 241-249 <DOI:10.1007/978-3-642-38622-0_25>.

Menchon-Lara, R-M. et al., "Fully automatic segmentation of ultrasound common carotid artery images based on machine learning", Neurocomputing, Mar. 2015 (available online Oct. 2014), vol. 151, No. 1, pp. 161-167 <DOI:10.1016/j.neucom.2014.09.066>.

Mosinska, J. et al., "Active learning and proofreading for delineation of curvilinear structures", Medical Image Computing and Computer Assisted Intervention—MICCAI (Quebec City, Canada, Sep. 11-13, 2017), 2017, pp. 165-173.

Mozaffarian, D. et al., "Heart Disease and Stroke Statistics—2015 Update", Circulation, Jan. 2015 (available online Dec. 2014), vol. 131, No. 4, pp. e29-e322 <DOI:10.1161/CIR.0000000000000152>.

Pabby, A. et al., "Analysis of colorectal cancer occurrence during surveillance colonoscopy in the dietary Polyp Prevention Trial", Gastrointestinal Endoscopy, Mar. 2005, vol. 61, No. 3, pp. 385-391 <DOI:10.1016/S0016-5107(04)02765-8>.

Pan, S. et al., "A survey on transfer learning", IEEE Transactions on Knowledge and Data Engineering, Oct. 2010 (Date of Publication: Oct. 16, 2009), vol. 22, No. 10, pp. 1345-1359 <DOI:10.1109/TKDE.2009.191>.

Rabeneck, H. et al., "Outcomes of colorectal cancer in the united states: no change in survival (1986-1997).", The American Journal of Gastroenterology, Feb. 2003, vol. 98, No. 2, pp. 471-477 <DOI:10.1111/j.1572-0241.2003.07260.x>.

(56) References Cited

OTHER PUBLICATIONS

Sadigh, G. et al., "Challenges, controversies, and hot topics in pulmonary embolism imaging", American Journal of Roentgenology, Mar. 2011, vol. 196, No. 3, pp. 497-515 <DOI:10.2214/AJR.10.5830>.
Schlegl, J. et al., "Unsupervised pre-training across image domains improves lung tissue classification", Medical Computer Vision: Algorithms for Big Data International Workshop (Cambridge, MA, Sep. 18, 2014), 2014, pp. 82-93.
Alex, V., et al., "Generative adversarial networks for brain lesion detection," in Medical Imaging 2017: Image Processing, vol. 10133, p. 101330G, International Society for Optics and Photonics, 2017.
Anders, C. et al., "Understanding Patch-Based Learning by Explaining Predictions", arXiv.org, submitted Jun. 2018, 7 pages, arXiv:1806.06926v1.
Arjovsky, M., et al., "Wasserstein generative adversarial networks," in International Conference on Machine Learning, pp. 214-223, 2017.
Bai, W., et al., "Semi-supervised learning for network-based cardiac mr image segmentation," in International Conference on Medical Image Computing and Computer-Assisted Intervention, pp. 253-260. Springer, 2017.
Baumgartner, C.F., et al., "Visual feature attribution using wasserstein gans," in Proc IEEE Comput Soc Conf Comput Vis Pattern Recognit, 2017.
Cai, J., et al., "Iterative attention mining for weakly supervised thoracic disease pattern localization in chest x-rays," in International Conference on Medical Image Computing and Computer-Assisted Intervention, pp. 589-598. Springer, 2018.
Chang, H., et al., "Pairedcyclegan: Asymmetric style transfer for applying and removing makeup," in 2018 IEEE Conference on Computer Vision and Pattern Recognition (CVPR), 2018.
Chen, X., et al., "Unsupervised detection of lesions in brain mri using constrained adversarial autoencoders," arXiv preprint arXiv:1806.04972, 2018.
Choi, Y., et al., "Stargan: Unified generative adversarial networks for multidomain image-to-image translation," in the IEEE Conference on Computer Vision and Pattern Recognition (CVPR), Jun. 2018,https://github.com/yunjey/StarGAN.
Goodfellow, I., et al., "Generative adversarial nets," in Advances in neural information processing systems, pp. 2672-2680, 2014.
Gulrajani, I., et al., "Improved training of wasserstein gans," in Advances in Neural Information Processing Systems, pp. 5767-5777, 2017.
Hwang, S., et al., "Self-transfer learning for weakly supervised lesion localization," in Medical Image Computing and Computer-Assisted Intervention—MICCAI 2016, pp. 239-246, Springer International Publishing.
Isola, P., et al., "Image-to-image translation with conditional adversarial networks," arXiv preprint arXiv:1611.07004, 2016.
Kim, T., et al., "Learning to discover cross-domain relations with generative adversarial networks," in International Conference on Machine Learning, pp. 1857-1865, 2017.
Kistler, M., et al., "The virtual skeleton database: An open access repository for biomedical research and collaboration," J Med Internet Res, 15(11):e245, Nov. 2013.
Ledig, C., et al., "Photo-realistic single image super-resolution using a generative adversarial network," in CVPR, vol. 2, p. 4, 2017.
Li, Z., et al., "Thoracic disease identification and localization with limited supervision," in Proceedings of the IEEE Conference on Computer Vision and Pattern Recognition, pp. 8290-8299, 2018.
Liu, M.-Y., et al., "Unsupervised image-to-image translation networks," in Advances in Neural Information Processing Systems, pp. 700-708, 2017.
Liu, Z., et al., "Deep learning face attributes in the wild," in Proceedings of the IEEE International Conference on Computer Vision, pp. 3730-3738, 2015.
Menze, B. H., et al., "The multimodal brain tumor image segmentation benchmark (brats)," IEEE transactions on medical imaging, 34(10):1993, 2015.
Non-final Office Action for U.S. Appl. No. 16/397,990, dated Sep. 15, 2020, 67 pages.
Notice of Allowance for U.S. Appl. No. 16/397,990, dated Dec. 1, 2020, 11 pages.
Notice of Allowance for U.S. Appl. No. 16/397,990, dated Jan. 14, 2021, 16 pages.
Oquab, M., et al., "Is object localization for free?-weakly-supervised learning with convolutional neural networks," in Proceedings of the IEEE Conference on Computer Vision and Pattern Recognition, pp. 685-694, 2015.
Pinheiro, P. O., et al., "From image-level to pixellevel labeling with convolutional networks," in Proceedings of the IEEE Conference on Computer Vision and Pattern Recognition, pp. 1713-1721, 2015.
Schlegl, T., et al., "f-anogan: Fast unsupervised anomaly detection with generative adversarial networks," Medical Image Analysis, 2019, https://github.com/tSchiegl/f-AnoGAN.
Selvaraju, R. R., et al., "Grad-cam: Visual explanations from deep networks via gradient-based localization," in Proceedings of the IEEE International Conference on Computer Vision, pp. 618-626, 2017.
Shin, S. Y., et al., "Joint weakly and semi-supervised deep learning for localization and classification of masses in breast ultrasound images," IEEE transactions on medical imaging, 2018.
Simonyan, K., et al., "Deep inside convolutional networks: Visualising image classification models and saliency maps," arXiv preprint arXiv:1312.6034, 2013.
Singh, K. K., et al., "Hide-and-seek: Forcing a network to be meticulous for weakly-supervised object and action localization," in 2017 IEEE International Conference on Computer Vision (ICCV), pp. 3544-3553, IEEE, 2017.
Tang, Y., et al., "Attention-guided curriculum learning for weakly supervised classification and localization of thoracic diseases on chest radiographs," in International Workshop on Machine Learning in Medical Imaging, pp. 249-258, Springer, 2018.
Wang, K., et al., "Cost-effective active learning for deep image classification" (2017), IEEE Transactions on Circuits and Systems for Video Technology 27, pp. 2591-2600.
Wang, X., et al., "Chestx-ray8: Hospital-scale chest x-ray database and benchmarks on weakly-supervised classification and localization of common thorax diseases," in Proceedings of the IEEE Conference on Computer Vision and Pattern Recognition, pp. 2097-2106, 2017.
Wolterink, J. M., et al., "Deep mr to ct synthesis using unpaired data," in International Workshop on Simulation and Synthesis in Medical Imaging, pp. 14-23, Springer, 2017.
Yi, Z., "Dualgan: Unsupervised dual learning for image-to-image translation," in ICCV, pp. 2868-2876, 2017.
Zhang, X., "Adversarial complementary learning for weakly supervised object localization," in Proceedings of the IEEE Conference on Computer Vision and Pattern Recognition, pp. 1325-1334, 2018.
Zhou, B., et al., "Learning deep features for discriminative localization," in Proceedings of the IEEE Conference on Computer Vision and Pattern Recognition, pp. 2921-2929, 2016.
Zhu, J.-Y., et al., "Toward multimodal image-to-image translation," in Advances in Neural Information Processing Systems, pp. 465-476, 2017.
Zhu, J.-Y., et al., "Unpaired image-to-image translation using cycle-consistent adversarial networks," arXiv preprint, 2017.

\* cited by examiner

Process 1: Active incremental fine-tuning method.

Input:
$\mathcal{U} = \{\mathcal{C}_i\}, i \in [1, n]$ {$\mathcal{U}$ contains $n$ candidates}
$\mathcal{C}_i = \{x_i^j\}, j \in [1, m]$ {$\mathcal{C}_i$ has $m$ patches}
$\mathcal{M}_0$: pre-trained CNN
$b$: batch size
$\alpha$: patch selection ratio

Output:
$\mathcal{L}$: labeled candidates
$\mathcal{M}_t$: fine-tuned CNN model at Iteration $t$

Functions:
$p \leftarrow P(\mathcal{C}, \mathcal{M})$ {outputs of $\mathcal{M}$ given $\forall x \in \mathcal{C}$}
$\mathcal{M}_t \leftarrow F(\mathcal{L}, \mathcal{M}_{t-1})$ {fine-tune $\mathcal{M}_{t-1}$ with $\mathcal{L}$}
$a \leftarrow mean(p_i)$ {$a = \frac{1}{m}\sum_{j=1}^{m} p_i^j$}

Initialize:
$\mathcal{L} \leftarrow \emptyset, t \leftarrow 1$

1 repeat
2    for *each* $\mathcal{C}_i \in \mathcal{U}$ do
3       $p_i \leftarrow P(\mathcal{C}_i, \mathcal{M}_{t-1})$
4       if $mean(p_i) > 0.5$ then
5          $S_i' \leftarrow$ top $\alpha$ percent of the patches of $\mathcal{C}_i$
6       else
7          $S_i' \leftarrow$ bottom $\alpha$ percent of the patches of $\mathcal{C}_i$
8       end
9       Calculate $R_i$ for $S_i'$
10   end
11   Sort $\mathcal{C}_i$ in $\mathcal{U}$ according to $R_i$
12   Query labels for top $b$ candidates, yielding $\mathcal{Q}$
13   $\mathcal{L} \leftarrow \mathcal{L} \cup \mathcal{Q}; \mathcal{U} \leftarrow \mathcal{U} \setminus \mathcal{Q}$
14   $\mathcal{M}_t \leftarrow F(\mathcal{L}, \mathcal{M}_{t-1}); t \leftarrow t + 1$
15 until *classification performance is satisfactory*;

FIG. 1

Example AlexNet Architecture

| layer | type | input | kernel | stride | pad | output |
|---|---|---|---|---|---|---|
| data | input | 3x227x227 | N/A | N/A | N/A | 3x227x227 |
| conv1 | convolution | 3x227x227 | 11x11 | 4 | 0 | 96x55x55 |
| pool1 | max pooling | 96x55x55 | 3x3 | 2 | 0 | 96x27x27 |
| conv2 | convolution | 96x27x27 | 5x5 | 1 | 2 | 256x27x27 |
| pool2 | max pooling | 256x27x27 | 3x3 | 2 | 0 | 256x13x13 |
| conv3 | convolution | 256x13x13 | 3x3 | 1 | 1 | 384x13x13 |
| conv4 | convolution | 384x13x13 | 3x3 | 1 | 1 | 384x13x13 |
| conv5 | convolution | 384x13x13 | 3x3 | 1 | 1 | 256x13x13 |
| pool5 | max pooling | 256x13x13 | 3x3 | 2 | 0 | 256x6x6 |
| fc6 | fully connected | 256x6x6 | 6x6 | 1 | 0 | 4096x1 |
| fc7 | fully connected | 4096x1 | 1x1 | 1 | 0 | 4096x1 |
| fc8 | fully connected | 4096x1 | 1x1 | 1 | 0 | Cx1 |

(C can have any suitable value, such as 2 for binary labels)

FIG. 2

| Application | Method | $\mu$ | $\alpha$ | $\alpha/_{c8}$ | $\gamma$ | epochs |
|---|---|---|---|---|---|---|
| Colonoscopy Frame Classification | AIFT↓ | 0.9 | 0.0001 | 0.001 | 0.95 | 20 |
| | AIFT↑ | 0.9 | 0.0001 | 0.0001 | 0.95 | 15 |
| | Learning from Scratch | 0.9 | 0.0001 | 0.001 | 0.95 | 20 |
| Polyp Detection | AIFT↓ | 0.9 | 0.001 | 0.01 | 0.95 | 5 |
| | AIFT↑ | 0.9 | 0.0001 | 0.001 | 0.10 | 3 |
| | Learning from Scratch | 0.9 | 0.001 | 0.01 | 0.95 | 10 |
| Pulmonary Embolism Detection | AIFT↓ | 0.9 | 0.001 | 0.01 | 0.95 | 10 |
| | AIFT↑ | 0.9 | 0.001 | 0.01 | 0.10 | 5 |
| | Learning from Scratch | 0.9 | 0.001 | 0.01 | 0.95 | 20 |

[1] Polyp Detection AIFT Diversity↑: 0.9 | 0.001 | 0.01 | 0.50 | 3

FIG. 3

| Prediction Pattern | Example | Entropy | Entropy$^{1/4}$ | Diversity | Diversity$^{1/4}$ | (Entropy+Diversity) | (Entropy+Diversity)$^{1/4}$ |
|---|---|---|---|---|---|---|---|
| A | (0.4 0.4 0.4 0.5 0.5 0.5 0.5 0.5 0.5 0.5 0.6 0.6) | 7.83 * | 2.02 * | 4.35 | 0.30 | 11.85 | 2.02 |
| B | (0.0 0.1 0.2 0.3 0.4 0.4 0.6 0.7 0.8 1.0 1.0) | 4.57 + | 0.83 + | 1237.21 + | 29.79 * | 1241.77 + | 31.62 * |
| C | (0.0 0.0 0.0 0.0 0.1 0.1 0.9 0.9 1.0 1.0 1.0 1.0) | 1.30 | 0.00 | 2816.86 * | 0.30 | 2817.96 * | 0.00 |
| D | (0.0 0.0 0.0 0.0 0.0 0.0 0.9 0.8 1.0 1.0 1.0 0.1) | 1.30 | 0.00 | 189.53 | 0.30 | 190.84 | 0.00 |
| E | (0.0 0.0 0.0 0.9 0.8 0.9 1.0 1.0 1.0 1.0 1.0 1.0) | 1.30 | 0.00 | 189.54 | 0.30 | 190.84 | 0.00 |
| F | (0.0 0.0 0.0 0.1 0.1 0.1 0.1 0.2 0.2 0.3 0.9 1.0) | 3.24 | 0.33 | 1076.87 | 13.54 + | 1080.11 | 13.86 + |
| G | (0.0 0.1 0.7 0.8 0.8 0.9 0.9 0.9 0.9 1.0 1.0) | 3.24 | 0.33 | 1076.87 | 13.54 + | 1080.11 | 13.86 + |

FIG. 4

Process 2: Active fine-tuning

Input:
$\mathcal{U} = \{C_i\}, i \in [1, n]$ {$\mathcal{U}$ contains $n$ AUs}
$C_i = \{x_i^j\}, j \in [1, m]$ {$C_i$ has $m$ objects}
$\mathcal{M}$: a pre-trained CNN
$b$: batch size
Output:
$\mathcal{L}$: the labeled AUs
$\mathcal{M}_t$: the fine-tuned CNN model at Iteration $t$
Initialize:
$\mathcal{L} \leftarrow \varnothing$ 1 repeat
2     for *each* $C_i \in \mathcal{U}$ do
3        $p_i \leftarrow P(C_i, \mathcal{M}_{t-1})$ {outputs of $\mathcal{M}_{t-1}$ given $\forall x_i \in C_i$}
4        $\mathcal{E}_i \leftarrow E(C_i)$ {compute entropy $\mathcal{E}_i$ for $C_i$
5     end
6     $\mathcal{U}' \leftarrow S(\mathcal{U}, \mathcal{E})$ {sort $C_i \in \mathcal{U}$ according to the value of $\mathcal{E}_i \in \mathcal{E}$}
7     $\mathcal{Q} \leftarrow Q(\mathcal{U}', b)$ {associate labels for the top $b$ AUs in the sorted $\mathcal{U}'$}
8     $\mathcal{L} \leftarrow \mathcal{L} \cup \mathcal{Q}; \mathcal{U} \leftarrow \mathcal{U} \setminus \mathcal{Q}; t \leftarrow t+1$
9     $\mathcal{M}_t \leftarrow F(\mathcal{L}, \mathcal{M})$ {fine-tune $\mathcal{M}$ with $\mathcal{L}$}
10 until *classification performance is satisfactory*;

FIG. 5

Process 3: $AFT^*$ — Active, continuous fine-tuning with hybrid data

Input:
  $\mathcal{D} = \{\mathcal{U}_i\}$, $i \in [1,n]$ {unlabeled pool $\mathcal{D}$ contains $n$ AUs}
  $\mathcal{U}_i = \{x_i^j\}$, $j \in [1,m]$ {$\mathcal{U}_i$ has $m$ patches}
  $\mathcal{M}_0$: pre-trained CNN
  $\alpha$: majority selection ratio; $b$: batch size; $\omega$: random extension

Output:
  $\mathcal{L}$: labeled AUs; $\mathcal{M}_\mathcal{T}$: fine-tuned CNN model at iteration $\mathcal{T}$ 1   $\mathcal{L} \leftarrow \emptyset$; $\mathcal{T} \leftarrow 1$
2   repeat
3     for each $\mathcal{U}_i \in \mathcal{D}$ do
4       $p_i \leftarrow P(\mathcal{U}_i, \mathcal{M}_{\mathcal{T}-1})$ {outputs of $\mathcal{M}_{\mathcal{T}-1}$ given $\forall x \in \mathcal{U}_i$}
5       if $mean(p_i) > 0.5$ then
6         $\mathcal{U}_i^\alpha \leftarrow$ top $\alpha$ percent patches of $\mathcal{U}_i$
7       else
8         $\mathcal{U}_i^\alpha \leftarrow$ bottom $\alpha$ percent patches of $\mathcal{U}_i$
9       end
10      Compute quota $\mathcal{R}_i$ for $\mathcal{U}_i^\alpha$
11    end
12    $(\mathcal{D}', \mathcal{R}') \leftarrow S(\mathcal{D}, \mathcal{R})$ {sort $\mathcal{D}$ according to $\mathcal{R}$ in the descending order}
13    $\mathcal{R}'_i \leftarrow (\mathcal{R}'_i - \mathcal{R}'_{\omega b})/(\mathcal{R}'_1 - \mathcal{R}'_{\omega b}), \forall i \in [1, \omega b]$;   $\mathcal{R}^{sel}_i \leftarrow \mathcal{R}'_i / \sum_i \mathcal{R}'_i, \forall i \in [1, \omega b]$
14    $\mathcal{Q} \leftarrow Q(\mathcal{R}^{sel}_i, b)$ {associate labels for $b$ AUs with sampling probabilities $\mathcal{R}^{sel}$}
15    $p \leftarrow P(\mathcal{L}, \mathcal{M}_{\mathcal{T}-1})$ {outputs of $\mathcal{M}_{\mathcal{T}-1}$ given $\forall x \in \mathcal{L}$}
16    $\mathcal{H} \leftarrow J(p, gt)$ {select misclassified $\mathcal{H}$ based on their ground truth $gt$}
17    $\mathcal{M}_\mathcal{T} \leftarrow F(\mathcal{H} \cup \mathcal{Q}, \mathcal{M}_{\mathcal{T}-1})$ {fine-tune $\mathcal{M}_{\mathcal{T}-1}$ with $\mathcal{H} \cup \mathcal{Q}$}
18    $\mathcal{L} \leftarrow \mathcal{L} \cup \mathcal{Q}$;   $\mathcal{D} \leftarrow \mathcal{D} \setminus \mathcal{Q}$;   $\mathcal{T} \leftarrow \mathcal{T} + 1$
19   until *classification performance is satisfied*;

FIG. 11

**Process 1: AFT\* – Active, continuous fine-tuning with hybrid data**

Input:
$U = \{C_i\}, i \in [1, n]$ {unlabeled pool $U$ contains $n$ candidates}
$C_i = \{x_j^i\}, j \in [1, m]$ {$C_i$ has $m$ patches}
$M_0$: pre-trained CNN; $\alpha$: majority selection ratio; $b$: batch size; $\mathcal{Y}$: category set

Output:
$\mathcal{L}$: labeled candidates; $M_T$: fine-tuned CNN model at Step $T$ 1  $\mathcal{L} \leftarrow \emptyset; T \leftarrow 1$
2  repeat
3   for each $C_i \in U$ do
4    $\mathcal{P}_i \leftarrow M_{T-1}(C_i)$ {outputs of $M_{T-1}$ given $\forall x \in C_i$}
5    $C_i' \leftarrow C_i$ sorted in a descending order according to the predicted dominant class $\hat{y} \leftarrow \text{argmax}_{y \in \mathcal{Y}} \sum \mathcal{P}_i^y$
6    $C_i^\alpha \leftarrow$ top $\alpha \times 100\%$ of the patches of the sorted list $C_i'$
7    Compute $\mathcal{A}_i$ for $C_i^\alpha$ (Eq. 3)
8   end
9   Sort $U$ according to $\mathcal{A}$ in a descending order
10  Compute sampling probability $\mathcal{A}^s$ using sorted list $\mathcal{A}'$ (Eq. 5 and Eq. 6)
11  Associate labels for $b$ candidates with sampling probabilities: $Q \leftarrow Q(\mathcal{A}^s, b)$
12  $\mathcal{P} \leftarrow M_{T-1}(\mathcal{L})$ {outputs of $M_{T-1}$ given $\forall x \in \mathcal{L}$}
13  Select misclassified candidates from $\mathcal{L}$ based on their annotation: $\mathcal{H} \leftarrow J(\mathcal{P}, \mathcal{L})$
14  Fine-tune $M_{T-1}$ with $\mathcal{H} \cup Q$: $M_T \leftarrow F(\mathcal{H} \cup Q, M_{T-1})$
15  $\mathcal{L} \leftarrow \mathcal{L} \cup Q; U \leftarrow U \setminus Q; T \leftarrow T + 1$
16 until classification performance is satisfied;

FIG. 14

SYSTEMS, METHODS, AND/OR MEDIA, FOR SELECTING CANDIDATES FOR ANNOTATION FOR USE IN TRAINING A CLASSIFIER

CROSS-REFERENCE TO RELATED APPLICATIONS

This application claims the benefit of U.S. Provisional Patent Application No. 62/491,069, filed Apr. 27, 2017, and U.S. Provisional Patent Application No. 62/663,931, filed Apr. 27, 2018, each of which is hereby incorporated by reference herein its entirety.

STATEMENT REGARDING GOVERNMENT FUNDED RESEARCH

This invention was made with government support under R01 HL128785 awarded by the National Institutes of Health. The government has certain rights in the invention.

BACKGROUND

Intense interest in applying classifiers (such as convolutional neural networks (CNNs)) in biomedical image analysis is wide spread. For example, CNNs can be used to suggest to an authorized professional whether one or more biomedical images are likely to have one or more given characteristics (which can be represented by one or more of |Y| possible labels) so that the professional can diagnose a medical condition of a patient.

In order for a CNN to perform this function, the CNN needs to be trained using annotated biomedical training images that indicate whether the training images have one or more of the |Y| possible labels. For example, for the CNN to be able to spot a condition in an image, many training images annotated as showing the condition and many training images annotated as not showing the condition can be used to train the CNN. The better trained the CNN is, the less likely the CNN is to misclassify an image.

The success of CNNs for this purpose, however, is impeded by the lack of large annotated datasets in biomedical imaging. Annotating biomedical images is not only tedious and time consuming, but also demanding of costly, specialty-oriented knowledge and skills, which are not easily accessible.

Accordingly, new mechanisms for reducing the burden of annotating biomedical images are desirable.

SUMMARY

In accordance with some embodiments, systems, methods, and media, for selecting candidates for annotation for use in training a classifier are provided.

In some embodiments, systems for selecting candidates for labelling and use in training a convolutional neural network (CNN) are provided, the systems comprising: a memory device; and at least one hardware processor configured to: receive a plurality of input candidates, wherein each candidate includes a plurality of identically labelled patches; and for each of the plurality of candidates: determine a plurality of probabilities, each of the plurality of probabilities being a probability that a unique patch of the plurality of identically labelled patches of the candidate corresponds to a label using a pre-trained CNN; identify a subset of candidates of the plurality of input candidates, wherein the subset does not include all of the plurality of candidates, based on the determined probabilities; query an external source to label the subset of candidates to produce labelled candidates; and train the pre-trained CNN using the labelled candidates.

In some embodiments, methods for selecting candidates for labelling and use in training a convolutional neural network (CNN) are provided, the methods comprising: receiving a plurality of input candidates at a hardware processor, wherein each candidate includes a plurality of identically labelled patches; and for each of the plurality of candidates: determining a plurality of probabilities, each of the plurality of probabilities being a probability that a unique patch of the plurality of identically labelled patches of the candidate corresponds to a label using a pre-trained CNN; identifying a subset of candidates of the plurality of input candidates, wherein the subset does not include all of the plurality of candidates, based on the determined probabilities; querying an external source to label the subset of candidates to produce labelled candidates; and training the pre-trained CNN using the labelled candidates.

BRIEF DESCRIPTION OF THE DRAWINGS

FIG. 1 is an example of process for active incremental fine-tuning (AIFT) of a CNN in accordance with some embodiments.

FIG. 2 is an example of an AlexNet architecture in accordance with some embodiments.

FIG. 3 is an example of a table of learning parameters that can be used to fine tune a CNN in accordance with some embodiments.

FIG. 4 is an example of histograms showing prediction patters of different types of candidates in accordance with some embodiments.

FIG. 5 is an example of a process for active fine-tuning (AFT) in accordance with some embodiments.

FIG. 11 is an example of another process for active fine-tuning (AFT) in accordance with some embodiments.

FIG. 14 is an example of still another process for active fine-tuning (AFT) in accordance with some embodiments.

DETAILED DESCRIPTION

Figure 6:
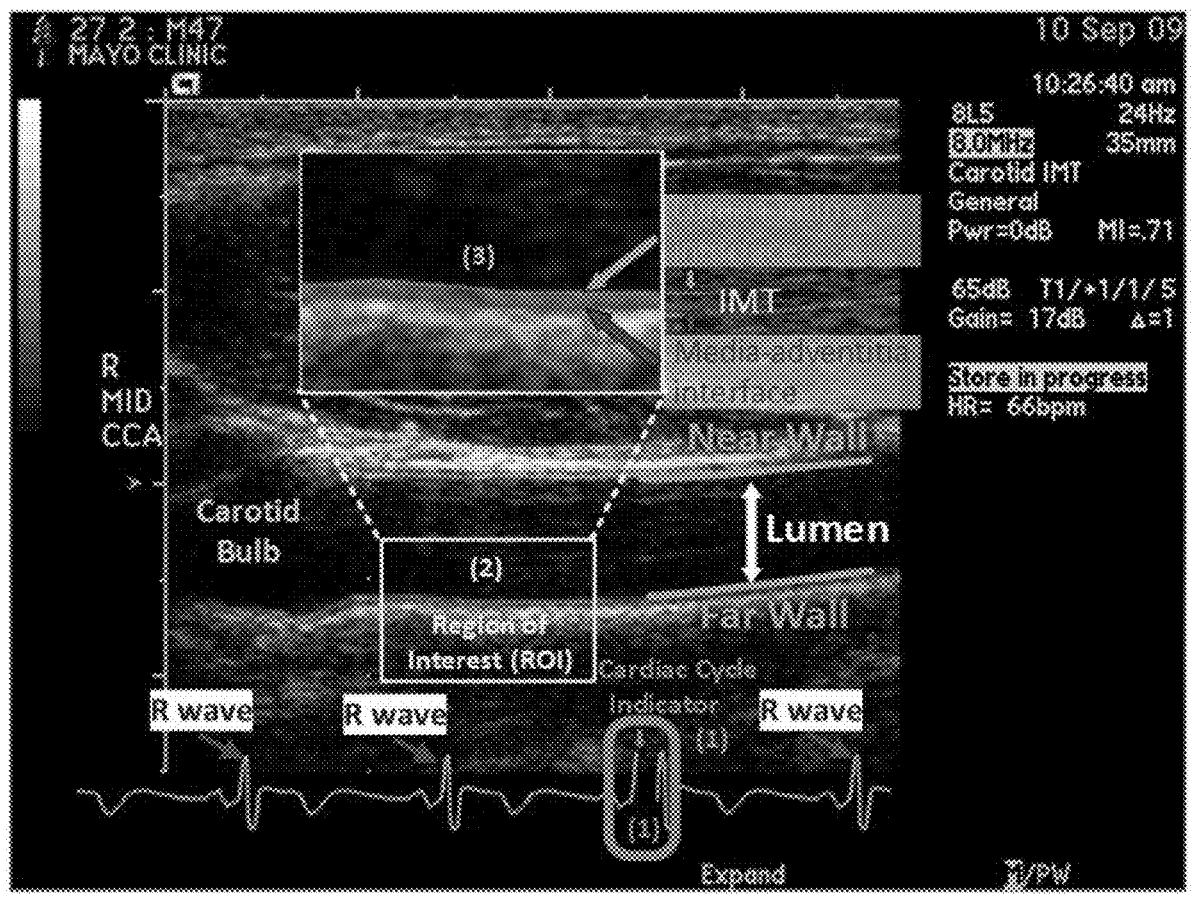
FIG. 6 is an example of a longitudinal view of a carotid artery in an ultrasound B-scan image in accordance with some embodiments.

The research underlying the various embodiments described herein was partly funded by the National Institutes of Health (NIH) under grant R01 HL128785. The applicants thank the NIH for its support of certain aspects of this work.

In accordance with some embodiments, mechanisms, which can include systems, methods, and/or media, for selecting candidates for annotation for use in training a classifier are provided. In some embodiments, the mechanisms can be used in connection with computer aided diagnosis (CAD) in biomedical imaging. More particularly, for example, the mechanisms can be used to select images for annotation, the images can be annotated (in any suitable manner), the annotated images can be used to fine-tune a classifier, and that classifier can be used to perform computer aided diagnosis on biomedical images used, for example, to help an authorized professional (e.g., a medical doctor) to diagnose a medical condition of a patient.

Turning to FIG. 1, an example of a process for selecting images for annotation and subsequently using those images to fine-tune a CNN is provided.

As shown, the process receives as an input a set U of n candidates $C_i$, where $i \in [1, n]$. The candidates can be received from any suitable source. For example, in some embodiments, a CAD system can include a candidate generator which can produce the set of candidates. Each of the candidates $C_i$ can be labelled with one of more of |Y| possible labels (e.g., informative or non-informative). Some of the candidates can be correctly labelled (true positives) and some of the candidates can be incorrectly labelled (false positives). These candidates can be produced in any suitable manner. For example, in some embodiments, candidate images can be extracted from video.

As also shown in FIG. 1, each candidate $C_i$ has m patches $x_i^j$, where $j \in [1, m]$. The patches can be received from any suitable source. For example, in some embodiments, the patches $x_i^j$ can be generated automatically for each candidate $C_i$ through data augmentation.

Data augmentation can be performed in any suitable manner, and any suitable amount of data augmentation can be performed in some embodiments. For example, in some embodiments, an image that is a single frame of a colonoscopy video and that has a size of 712 pixels by 480 pixels can be received and used to form a candidate. The whole image can be labeled as informative or non-informative. The image can then be cropped into 21 patches (e.g., images that are 50 pixels by 50 pixels) from the image by translating the image by ten (or any other suitable numbers, such as twenty) percent of a resized bounding box in vertical and horizontal directions. Each resulting patch can be rotated eight times by mirroring and flipping. All 21 patches can then share the same label and the group of these patches is named as one candidate.

In some embodiments, a factor f (e.g., where factor $f \in \{1.0, 1.2, 1.5\}$) can be used to enlarge a patch (e.g., to realize an augmented data set of the original size, 1.2 times larger, and 1.5 times larger) and then crop it back to the original size. For example, if one patch is sized at 10 pixels by 10 pixels, it can be enlarged by a factor f equal to 1.2 to produce a patch of 12 pixels by 12 pixels, and then the patch can be crop to the center 10 pixels by 10 pixels as new a patch after data augmentation.

The manner of performing data augmentation can be based on the application. For example, for colonoscopy frame classification, translation data augmentation can be applied by ten percent of a resized bounding box in vertical and horizontal directions. As another example, for polyp detection, rotation data augmentation can be applied at the center of polyp location. As still another example, for pulmonary embolism detection, scale plus rotation data augmentation can be applied—e.g., by extracting three different physical sizes, e.g., 10 mm, 15 mm, 20 mm wide, by rotating the longitudinal and cross-sectional vessel planes around the vessel axis.

The patches generated from the same candidate can be given the same label(s).

As further shown in FIG. 1, the process receives a pre-trained CNN $M_0$. Any suitable pre-trained CNN can be used, and the pre-trained CNN can be received from any suitable source. For example, in some embodiments, the pre-trained CNN be a pre-trained AlexNet, which can have an architecture as described in FIG. 2 in some embodiments. As other examples, in some embodiments, VGG, GoogleNet, or the ResNet can be used instead of an AlexNet.

As still further shown in FIG. 1, the process can receive a batch size parameter b and a patch selection ratio parameter $\alpha$. These parameters can have any suitable values. For example, b can be 10 and $\alpha$ can be 1/4.

The outputs of the process shown in FIG. 1 include a set L of labelled candidates and a fine-tuned CNN model $M_t$ at iteration t. At the beginning, the labeled dataset L is initialized to be empty.

As shown in FIG. 1, in lines 1-15, the process loops until the classification performance of $M_t$ is satisfactory. What is satisfactory can be defined in any suitable manner. For example, the classification performance of $M_t$ can be determined to be satisfactory when newly annotated samples are mostly predicted by the current model correctly.

Between lines 2 and 10, the process can loop through each candidate $C_i$ in set U, where $i \in [1, n]$.

At line 3, the process can determine the probabilities of each patch $x_i^j$, where $j \in [1, m]$, in candidate $C_i$ corresponding to the |Y| labels by applying CNN $M_{t-1}$ to the patches.

Next, at line 4, the process can determine the average of the probabilities determined at line 3, and, if the average is greater than 0.5, the process can assign to a set $S_i'$ the top $\alpha$ percent of the m patches (i.e., the $\alpha$ percent of the m patches having the highest probabilities) of $C_i$ at line 5. Otherwise, if the average is less than or equal to 0.5, the process can assign to set $S_i'$ the bottom $\alpha$ percent of the m patches (i.e., the $\alpha$ percent of the m patches having the lowest probabilities) of $C_i$ at line 7.

Then, at line 9, the process can calculate a number $R_i$ for candidate $C_i$ using the patches in $S_i'$ using the following equation:

$$R_i = \lambda_1 e_i + \lambda_2 d_i$$

where:

$e_i$ represents the entropy of the candidate, and can be calculated in some embodiments using $$e_i = -\frac{1}{m} \sum_{k=1}^{|Y|} \sum_{j=1}^{m} p_i^{j,k} \log p_i^{j,k};$$

$d_i$ represents the diversity of the candidate, and can be calculated in some embodiments using $$d_i = \sum_{k=1}^{|Y|} \sum_{j=1}^{m} \sum_{l=j}^{m} (p_i^{j,k} - p_i^{l,k}) \log \frac{p_i^{j,k}}{p_i^{l,k}};$$

$\lambda_1$ represents a weighting factor for entropy $e_1$ in $R_i$, and $\lambda_2$ represents a weighting factor for diversity $d_1$ in $R_i$.

In some embodiments, $R_i$ can additionally or alternatively be calculated based on other characteristics of the patches of a candidate, such as variance, Gaussian distance, standard deviation, and divergence.

After the process has looped through all of the candidates $C_i$ in U at lines 2-10, the process sorts the candidates $C_i$ in U according to the corresponding values $R_i$ at line 11.

Next, the process queries for labels for the top b candidates of $C_i$ in U at line 12 to produce a set of labelled candidates Q. This can be performed in any suitable manner. For example, the top b candidates of $C_i$ in U can be presented to an authorized professional who can manually label each of the top b candidates.

Then, at line 13, the candidates in Q can be added to the set L and removed from the set U, and t can be incremented.

Finally, at line 14, the CNN $M_{t-1}$ can be fine-tuned using set L to produce new CNN $M_t$. The CNN can be fine-tuned in any suitable manner.

Intense interest in applying convolutional neural networks (CNNs) in biomedical image analysis is wide spread, but its success is impeded by the lack of large annotated datasets in biomedical imaging. Annotating biomedical images is not only tedious and time consuming, but also demanding of costly, specialty-oriented knowledge and skills, which are not easily accessible. The process illustrated in FIG. 1 integrates active learning and transfer learning into a single framework. This process starts directly with a pre-trained CNN to seek "worthy" samples from the unannotated for annotation, and the (fine-tuned) CNN is further fine-tuned continuously by incorporating newly annotated samples in each iteration to enhance the CNN's performance incrementally. An evaluation of this process has shown that in three different biomedical imaging applications, the cost of annotation can be cut by at least half. This performance is attributed to the several advantages derived from the advanced active and incremental capability of the process of FIG. 1.

For example, in some embodiments, an AlexNet can be fine-tuned for different example applications using the learning parameters shown in FIG. 3. In FIG. 3, μ is the momentum, αfc8 is the learning rate of the weights in the last layer, α is the learning rate of the weights in the rest of the layers, and γ determines how α decreases over epochs of the CNN. The learning rate for the bias term can be set to be twice as large as the learning rate of the corresponding weights. $AIFT_1$ indicates the first iteration of the process of FIG. 1 while $AIFT_+$ indicates all the following iterations of the process of FIG. 1.

As mentioned above, in lines 1-15, the process loops until the classification performance of $M_t$ is satisfactory. What is satisfactory can be defined in any suitable manner. For example, the classification performance of $M_t$ can be determined to be satisfactory when newly annotated samples are mostly predicted by current model correctly.

The CAD mechanism described herein can be used for any suitable application. For example, in some embodiments, it can be used for colonoscopy frame classification, polyp detection, pulmonary embolism (PE) detection, and carotid intima-media thickness (CIMT) image classification.

In some embodiments, the mechanisms described herein can be implemented in any suitable platform. For example, in some embodiments, the mechanisms can be implemented in the Caffe framework (described at http://caffe.berkeleyvision.org/, which is hereby incorporated by reference herein in its entirety) based on the pre-trained AlexNet model.

In some embodiments, values of $\lambda_1$, $\lambda_2$, and a can be as set forth in the following table for six example configurations:

| Name | $\lambda_1$ | $\lambda_2$ | α |
|---|---|---|---|
| Entropy | 1 | 0 | 100% |
| Entropy$^{1/4}$ | 1 | 0 | 25% |
| Diversity | 0 | 1 | 100% |
| Diversity$^{1/4}$ | 0 | 1 | 25% |
| (Entropy + Diversity) | 1 | 1 | 100% |
| (Entropy + Diversity)$^{1/4}$ | 1 | 1 | 25% |

Turning to FIG. 4, example histograms of $p_i^j$ for $j \in [1,m]$ showing prediction patterns of different types of candidates $C_i$ are shown. This table shows a histogram in the "Prediction Pattern" column for an example candidate, example probabilities for eleven patches of the candidate in the "example" column, a calculated entropy value corresponding to example probabilities in the same row in the "Entropy" column, a calculated entropy1/4 value corresponding to example probabilities in the same row in the "Entropy$^{1/4}$" column, a calculated diversity value corresponding to example probabilities in the same row in the "Diversity" column, a calculated Diversity$^{1/4}$ value corresponding to example probabilities in the same row in the "Diversity$^{1/4}$" column, a calculated (Entropy+Diversity) value corresponding to example probabilities in the same row in the "(Entropy+Diversity)" column, and a calculated (Entropy+Diversity)$^{1/4}$ value corresponding to example probabilities in the same row in the "(Entropy+Diversity)$^{1/4}$" column. The first choice for each configuration is highlighted by a "*" and the second choice for each configuration is highlighted by a "+".

As illustrated in the left column of the table in FIG. 4, there are seven typical prediction patterns for candidates:
- Pattern A: The patches' predictions are mostly concentrated at 0.5, with a higher degree of uncertainty. This type of candidate is good at reducing uncertainty.
- Pattern B: It is flatter than Pattern A, as the patches' predictions are spread widely from 0 to 1, yielding a higher degree of inconsistency. Since all the patches belonging to a candidate are generated via data augmentation argumentation, they (at least the majority of them) are expected to have similar predictions. This type of candidate has the potential to contribute significantly to enhancing a CNN's performance.
- Pattern C: The patches' predictions are clustered at both ends, resulting in a higher degree of diversity. This type of candidate is most likely associated with noisy labels at the patch level, and it is the least favorable in active selection because it may cause confusion in fine-tuning the CNN.
- Patterns D and E: The patches' predictions are clustered at one end (i.e., 0 or 1), with a higher degree of certainty. The annotation of these types of candidates at this stage should be postponed because the current CNN has most likely predicted them correctly; they would contribute very little to the fine-tuning of the current CNN. However, these candidates may evolve into different patterns worthy of annotation with more fine-tuning.
- Patterns F and G: They have higher degrees of certainty in some of the patches' predictions and are associated with some outliers in the patches' predictions. These types of candidates are valuable because they are capable of smoothly improving the CNN's performance. Though they may not make significant contributions, they should not cause dramatic harm to the CNN's performance.

In some embodiments, it may be observed that:
Patterns A and B are dominant in the earlier stages of the process of FIG. 1 as the CNN has not been fine-tuned properly to the target domain.
Patterns C, D and E are dominant in the later stages of the process of FIG. 1 as the CNN has been largely fine-tuned on the target dataset.
Entropy$^{1/4}$, Diversity$^{1/4}$, or (Entropy+Diversity)$^{1/4}$ are effective in excluding Patterns C, D, and E, while Entropy can handle Patterns C, D, and E reasonably well.
Patterns B, F, and G generally make good contributions to elevating the current CNN's performance.
Entropy and Entropy$^{1/4}$ favor Pattern A because of its higher degree of uncertainty.
Diversity$^{1/4}$ prefers Pattern B while Diversity prefers Pattern C. This is why Diversity may cause sudden disturbances in the CNN's performance and why Diversity$^{1/4}$ should be preferred in general.

Figure 12:
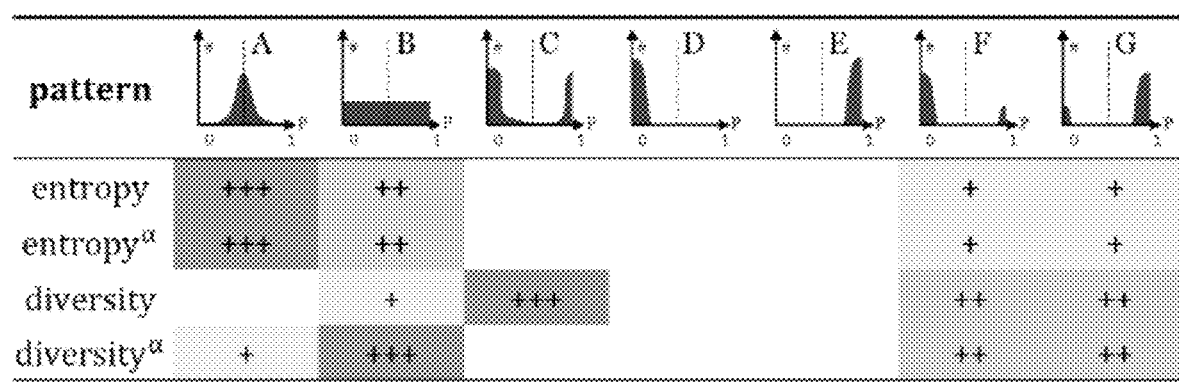
FIG. 12 is an example of a table for selecting prediction patterns based on entropy, Gaussian distance, standard deviation, diversity, variance, and divergence look in accordance with some embodiments.

In some embodiments, multiple methods may be used to select a particular pattern: for example, entropy, Gaussian distance, and standard deviation would seek Pattern A, while diversity, variance, and divergence look for Pattern C. See FIG. 12.

As mentioned above, in some embodiments, the mechanisms described herein can be used for carotid intima-media thickness (CIMT) image classification.

Turning to FIG. 5, an alternative process that can be used instead of the process of FIG. 1 in some embodiments is illustrated. As shown, the process receives as input a set U of annotation units (AUs) $\{C_1, C_2, \ldots, C_n\}$ (which are like the candidates described above, and are described in further detail below), where n is the number of AUs, and each $C_i = \{x_i^1, x_i^2, \ldots, x_i^m\}$ is associated with m objects $x_i^j$, where $j \in [1, m]$.

The objects can be received from any suitable source. For example, in some embodiments, the objects $x_i^j$ can be generated automatically for each AU $C_i$ through data augmentation.

Data augmentation can be performed in any suitable manner, and any suitable amount of data augmentation can be performed in some embodiments. For example, in some embodiments, an image that is a single frame of a colonoscopy video and that has a size of 712 pixels by 480 pixels can be received and used to form an AU. The whole image can be labeled as informative or non-informative. The image can then be cropped into 21 patches (e.g., images that are 50 pixels by 50 pixels) from the image by translating the image by ten (or any other suitable numbers, such as twenty) percent of a resized bounding box in vertical and horizontal directions. Each resulting patch can be rotated eight times by mirroring and flipping. All 21 patches can then share the same label and the group of these patches is named as one AU.

In some embodiments, a factor f (e.g., where factor $f \in \{1.0, 1.2, 1.5\}$) can be used to enlarge a patch (e.g., to realize an augmented data set of the original size, 1.2 times larger, and 1.5 times larger) and then crop it back to the original size. For example, if one patch is sized at 10 pixels by 10 pixels, it can be enlarged by a factor f equal to 1.2 to produce a patch of 12 pixels by 12 pixels, and then the patch can be crop to the center 10 pixels by 10 pixels as new a patch after data augmentation.

The manner of performing data augmentation can be based on the application. For example, for colonoscopy frame classification, translation data augmentation can be applied by ten percent of a resized bounding box in vertical and horizontal directions. As another example, for polyp detection, rotation data augmentation can be applied at the center of polyp location. As still another example, for pulmonary embolism detection, scale plus rotation data augmentation can be applied—e.g., by extracting three different physical sizes, e.g., 10 mm, 15 mm, 20 mm wide, by rotating the longitudinal and cross-sectional vessel planes around the vessel axis.

Each of the AUs $C_i$ can be labelled with one of more of $|Y|$ possible labels. Some of the AUs can be correctly labelled (true positives) and some of the AUs can be incorrectly labelled (false positives). These AUs can be produced in any suitable manner. For example, in some embodiments, AUs can be images extracted from video.

The patches generated from the same AU can be given the same label(s).

As further shown in FIG. 5, the process receives a pre-trained CNN M. Any suitable pre-trained CNN can be used, and the pre-trained CNN can be received from any suitable source. For example, in some embodiments, the pre-trained CNN be a pre-trained AlexNet CNN, which can have an architecture as described in FIG. 2 in some embodiments. As other examples, in some embodiments, VGGNet, GoogleNet, or the Microsoft Residual Network can be used instead of an AlexNet CNN.

As still further shown in FIG. 5, the process can receive a batch size parameter b. This parameter can have any suitable value. For example, b can be 10.

Like the process of FIG. 1, the process of FIG. 5, outputs a set L of labelled AUs and a fined-tuned CNN model $M_t$ at iteration t. When the process of FIG. 5 begins, L is initialized to an empty set.

As shown in the figure, in lines 1-10, the process loops until the classification performance of $M_t$ is satisfactory. What is satisfactory can be defined in any suitable manner. For example, the classification performance of $M_t$ can be determined to be satisfactory when newly annotated samples are mostly predicted by current model correctly.

Between lines 2 and 5, the process can loop through each AU $C_i$ in set U, where $i \in [1, n]$.

At line 3, the process can determine the probabilities of each object $x_i^j$, where $j \in [1, m]$, in AU $C_i$ corresponding to the $|Y|$ labels by applying CNN $M_{t-1}$ to the objects.

Next, at line 4, the process can determine the entropy of the AU using the following formula:

$$\varepsilon_i = -\frac{1}{m}\sum_{j=1}^{m}\sum_{k=1}^{|Y|}p_i^{j,k}\log p_i^{j,k}$$

After the process has looped through all of the AUs $C_i$ in U at lines 2-5, the process sorts the AUs $C_i$ in U according to the corresponding values entropy at line 6 and stores the sorted AUs in U'.

Next, the process queries for labels for the top b AUs of $C_i$ in U' at line 7 to produce a set of labelled candidates Q. This can be performed in any suitable manner. For example, the AUs in U' can be annotated as described below in connections with FIGS. 7A, 7B, and 7C.

Then, at line 8, the candidates in Q can be added to the set L and removed from the set U, and t can be incremented.

Finally, at line 9, the CNN $M_{t-1}$ can be fine-tuned using set L to produce new CNN $M_t$. The CNN can be fine-tuned in any suitable manner, for example as described above in connection with FIG. 1.

As mentioned above, in lines 1-10, the process loops until the classification performance of $M_t$ is satisfactory. What is satisfactory can be defined in any suitable manner. For example, the classification performance of $M_t$ can be determined to be satisfactory when newly annotated samples are mostly predicted by current model correctly.

The process of FIG. 5 can be used for any suitable application. For example, this process can be used to select AUs for annotation in connection with carotid intima-media thickness video (CIMT) interpretation.

Annotating CIMT is not only tedious, laborious, and time consuming, but also demanding of costly, specialty-oriented knowledge and skills, which are not easily accessible. As described herein, some embodiments dramatically reduce the cost of expert annotation in CIMT by providing: (1) a new mechanism which simplifies the entire CIMT annotation process to six simple mouse clicks; and (2) a new process (described in connection with FIG. 5) which naturally integrates active learning and transfer learning into a single framework. This process starts directly with a pre-trained convolutional neural network (CNN) to seek "worthy" samples from the unannotated for annotation, and then fine-tune the CNN by incorporating newly annotated samples in each iteration to enhance the CNN's performance gradually. Experiments demonstrate that this process can cut the cost of annotation by at least half in comparison with fine-tuning with random selection. This performance is attributed to several advantages derived from the advanced active fine-tuning capability of the process of FIG. 5.

Turning to FIG. 6, an example of a longitudinal view of a carotid artery in an ultrasound B-scan image is shown. CIMT is defined as the distance between the lumen-intima interface and the media-adventitia interface, measured approximately 1 cm distal from the carotid bulb on the far wall of the common carotid artery at the end of the diastole; therefore, interpreting a CIMT video involves three operations: (1) select three end-diastolic ultrasound frames (EUFs) in each video (the cardiac cycle indicator, a black line, shows to where in the cardiac cycle the current frame corresponds); (2) localize a region of interest (ROI) approximately 1 cm distal from the carotid bulb in the selected EUF; (3) measure the CIMT within the localized ROI.

Figure 7A:
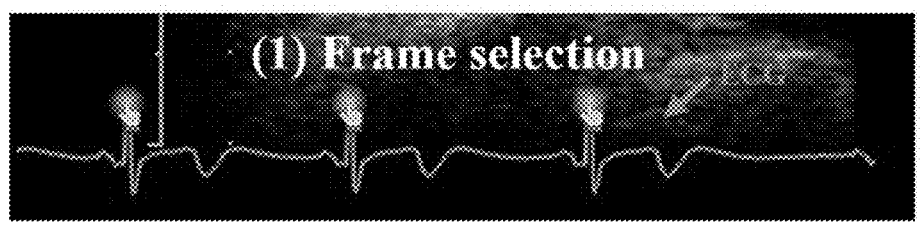
FIGS. 7A, 7B, and 7C illustrate an example of a process through which an authorized professional can annotate an annotation unit in accordance with some embodiments.
Figure 7B:
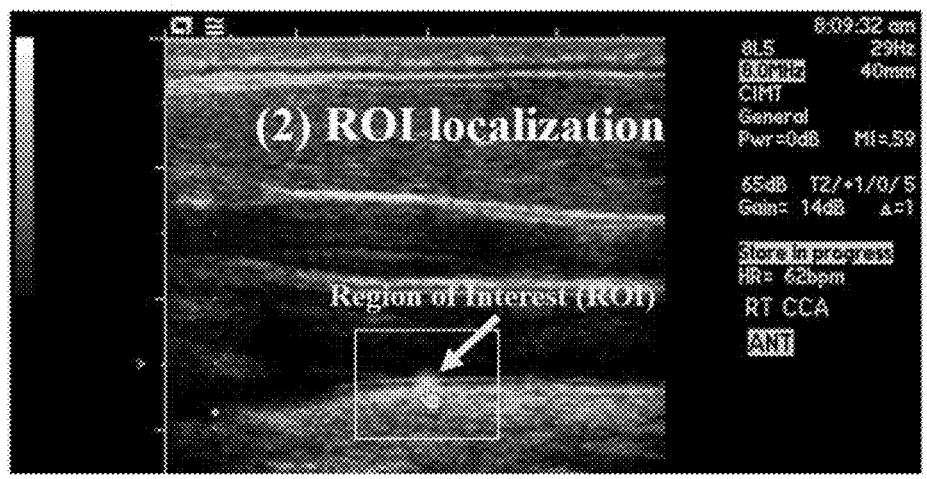
Figure 7C:
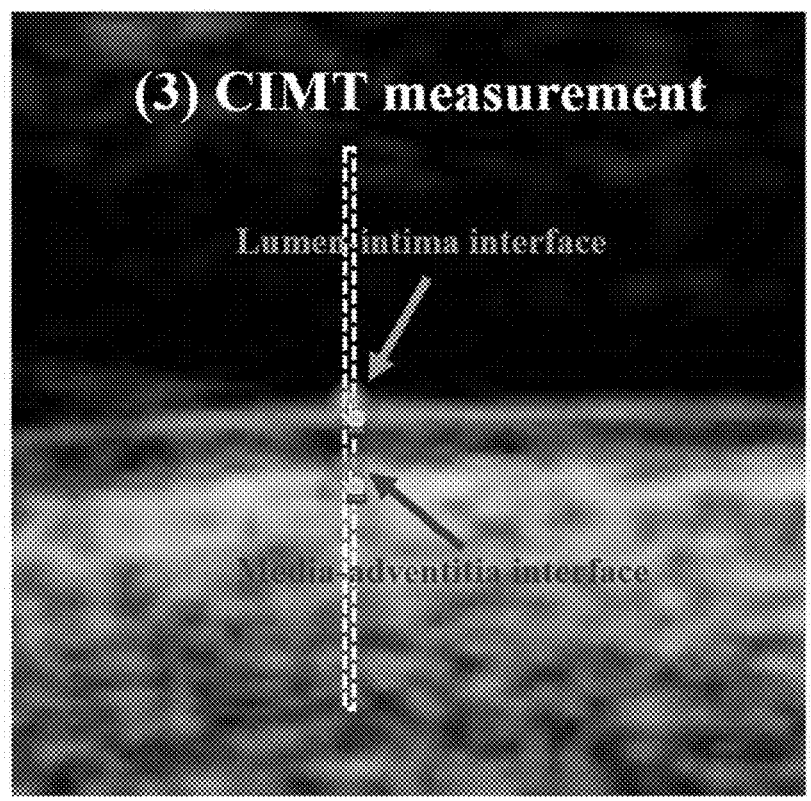

Turning to FIGS. 7A, 7B, and 7C, a process through which an authorized professional can annotate an AU in a CIMT application in accordance with some embodiments is shown. As illustrated, this process can begin by the process receiving three mouse clicks (or any other manner of selecting) on the R waves of the ECG signal in FIG. 7A. The process can then identify three end-diastolic ultrasound frames (EUFs) corresponding to where the clicks were made, and annotate those EUFs as Class 1, while annotating all other frames as Class 0. As shown in FIG. 7B, the process can next receive a mouse click on an EUF and use that click to identify the center of a region of interest (ROI) in the EUF. Given the relationship between the ROI and the carotid bulb (i.e., that the ROI is approximately 1 cm distal from the carotid bulb), the latter's location can then be estimated by the process. For data augmentation and classification robustness, all pixels within 15 mm from the selected center can be considered to be Class 1, and those pixels within 15 mm from the estimated bulb location can be considered to be Class 2, while all the rest of the pixels can be considered to belong to Class 0. Next, as shown in FIG. 7C, the process can automatically draw two vertical dashed lines and receive from an annotator two mouse clicks on the two interfaces between the two dashed lines. The optimal distance between the two dashed lines can be determined based on experiments, and can be set to one pixel (0.99 mm) in some embodiments. The top pixel and bottom pixel can be regarded as the lumen-intima interface (Class 1) and lumen-intima interface (Class 2) respectively, while all the rest pixels between the two lines can be regarded as background (Class 0).

Figure 8:
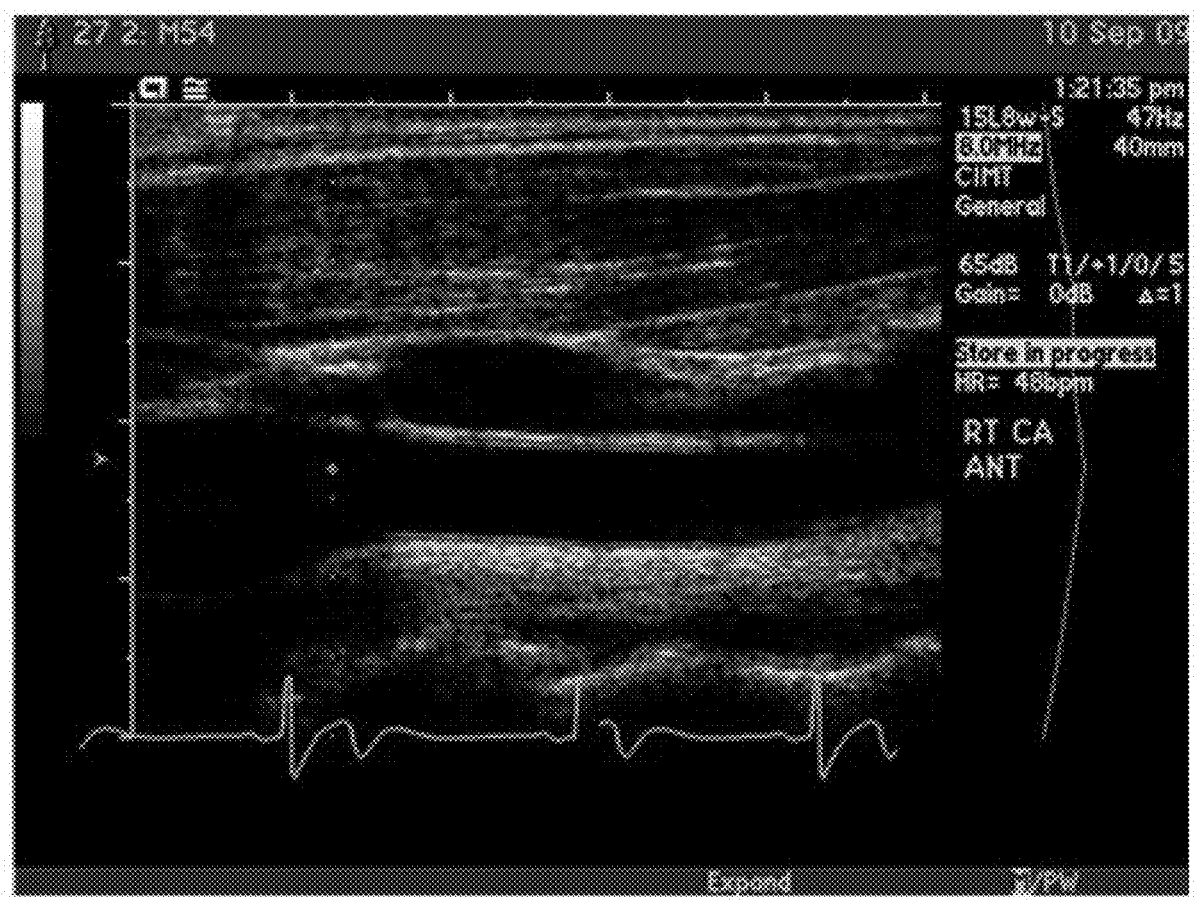
FIGS. 8, 9, 10A, 10B, and 10C illustrate an example of using a trained CNN to determine the location of a region of interest (ROI) a in accordance with some embodiments.
Figure 9:
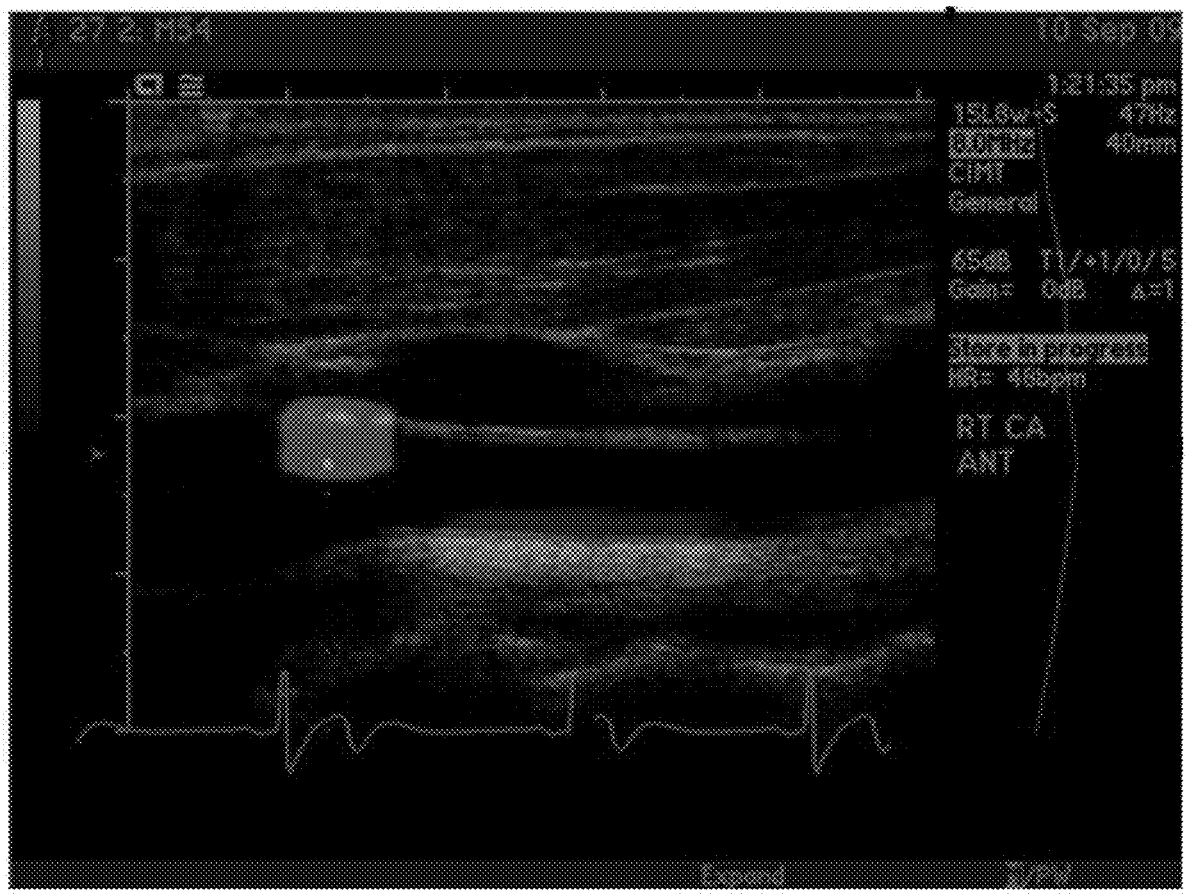
Figure 10A:
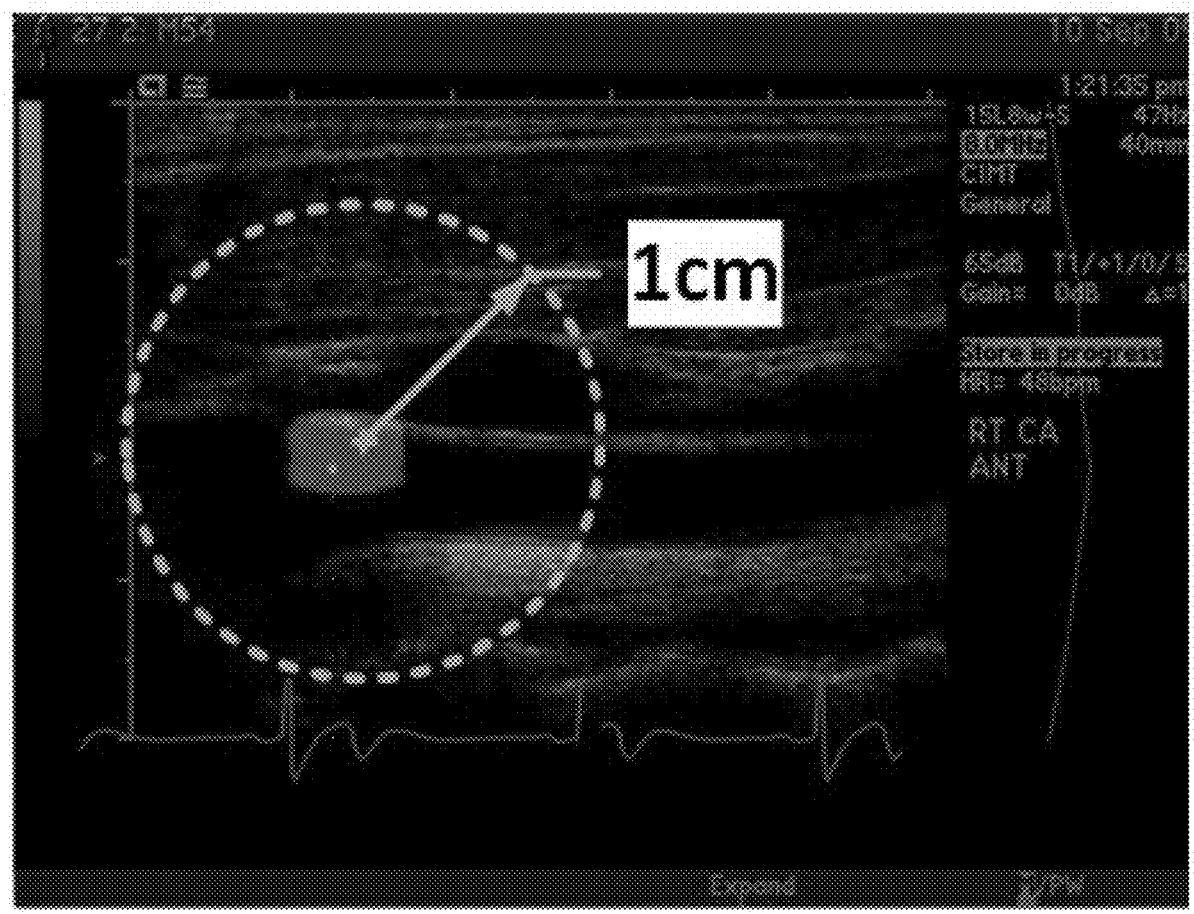

As discussed below in connection with FIGS. 8-10, a trained CNN can be used to identify the location of an ROI. After receiving an original image, as shown in FIG. 8, the trained CNN can be used to produce an ROI and bulb confidence map as shown in FIG. 9. The location of the carotid bulb can then be determined as the centroid of the largest connected component within the confidence map for the carotid bulb and, as shown in FIG. 10A, the location of the ROI $l_{roi}$) can be determined using the following formula:

$$l_{roi} = \frac{\Sigma_{p \in C} * M(p) \cdot p \cdot I(p)}{\Sigma_{p \in C} * M(p) \cdot I(p)}$$

where M(p) denotes the confidence map prediction of pixel p being in the ROI, C* is the largest connected component in M that is nearest to the carotid bulb, and I(p) is an indicator function for pixel $p=[p_x, p_y]$ that is defined as:

$$I(p) = \begin{cases} 1, & \text{if } \|p - l_{cb}\| < 1 \text{ cm} \\ 0, & \text{otherwise} \end{cases}$$

Figure 10B:
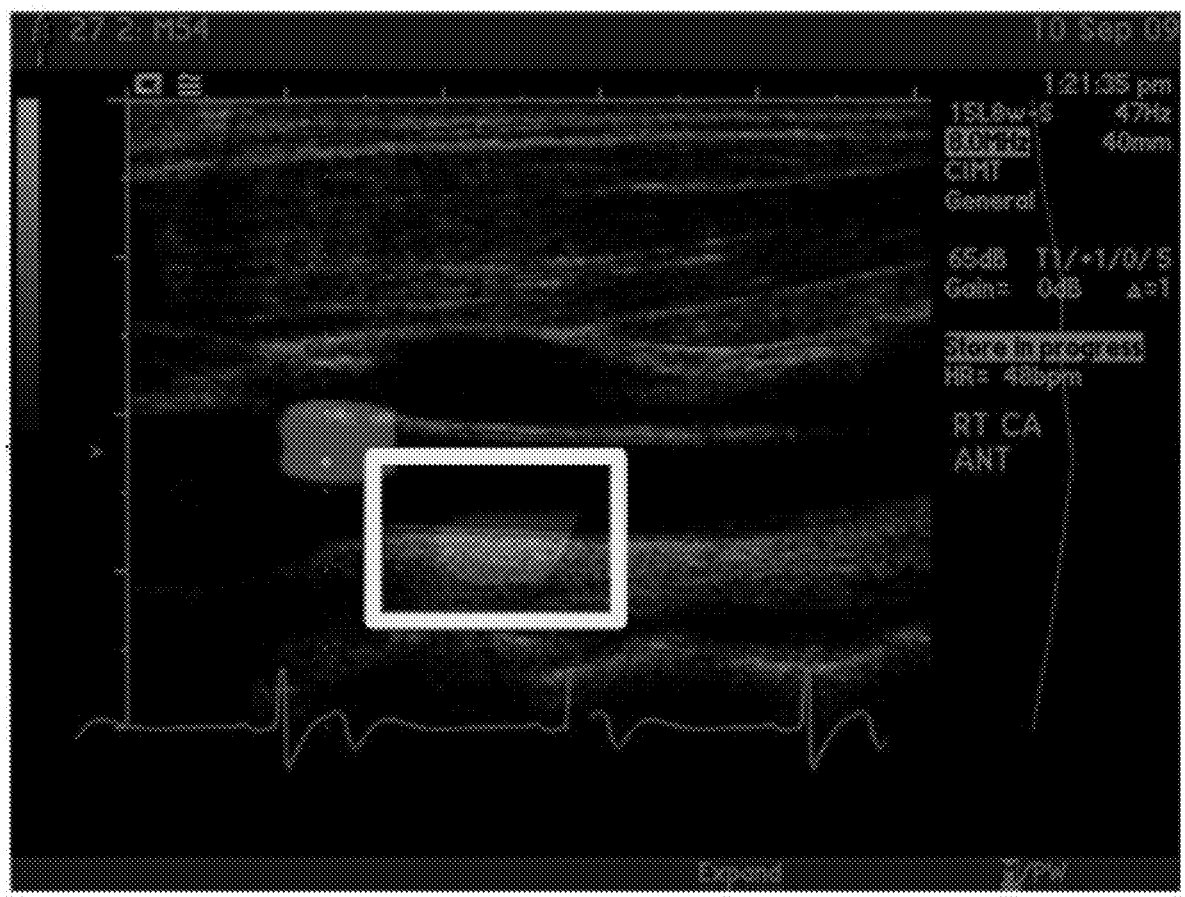
Figure 10C:
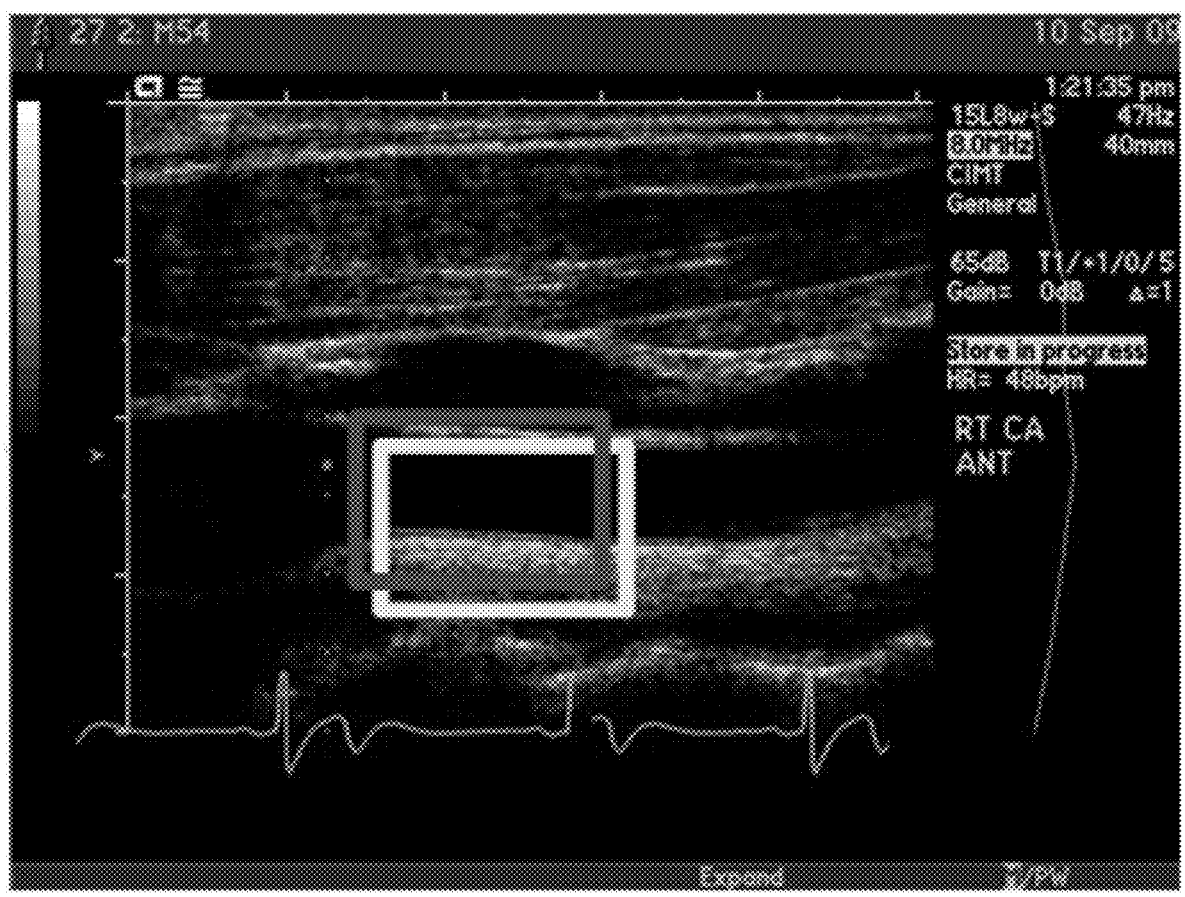

An example of a determined ROI is shown as the rectangle in FIG. 10B. FIG. 10C shows an example of a ground truth rectangle (the upper left rectangle) compared to the ROI rectangle (the lower left rectangle).

Basically, the indicator function excludes the pixels located farther than 1 cm from the carotid bulb location. This choice of the distance threshold is motivated by the fact that the ROI is located within 1 cm to the right of the carotid bulb. Any other distance can be used in some embodiments.

To automatically measure intima-media thickness, the lumen-intima and media-adventitia interfaces of the carotid artery must be detected within the ROI. This interface segmentation problem can be treated as a three-class classification task with the goal to classify each pixel within the ROI into one of three categories: 1) a pixel on the lumen-intima interface, 2) a pixel on the media-adventitia interface, and 3) a background pixel.

During operation, the trained CNN can be applied to a given suspected ROI in a convolutional manner, generating two confidence maps with the same size as the ROI. The first confidence map shows the probability of a pixel being on the lumen-intima interface; the second confidence map shows the probability of a pixel being on the media-adventitia interface. A relatively thick high-probability band is apparent along each interface, which hinders the accurate measurement of intima-media thickness. To thin the detected interfaces, the confidence map can be scanned column by column, searching for the rows with the maximum response for each of the two interfaces. By doing so, a one-pixel-thick boundary with a step-like shape around each interface can be obtained. To further refine the boundaries, two active contour models (a.k.a., snakes), one for the lumen-intima interface and one for the media-adventitia interface, can be used. The open snakes can be initialized with the current step-like boundaries and then deformed solely based on the probability maps generated by the CNN rather than the original image content.

Turning to FIG. 11, an example of a process that can be used alternatively to those described above in connections with FIGS. 1 and 5 in accordance with some embodiments is shown. Please note that, as shown in the process of FIG. 11, the set of annotation units is labelled D rather than U, the annotation units are labelled U, instead of $C_i$, and the iterations are identified by $\tau$ instead of t.

As shown, the process receives as an input a set D of n annotation units (AUs) $U_i$, where $i \in [1, n]$. The AUs can be received from any suitable source. For example, in some embodiments, a CAD system can include an AU generator which can produce the set of AUs. Each of the AUs $U_i$ can be labelled with one of more of |Y| possible labels. Some of the AUs can be correctly labelled (true positives) and some of the AUs can be incorrectly labelled (false positives). These AUs can be produced in any suitable manner. For example, in some embodiments, AU images can extracted from video.

As also shown in FIG. 11, each AU $U_i$ has m patches $x_i^j$, where $j \in [1, m]$. The patches can be received from any suitable source. For example, in some embodiments, the patches $x_i^j$ can be generated automatically for each AU $U_i$ through data augmentation.

Data augmentation can be performed in any suitable manner, and any suitable amount of data augmentation can be performed in some embodiments. For example, in some embodiments, an image that is a single frame of a colonoscopy video and that has a size of 712 pixels by 480 pixels can be received and used to form an AU. The whole image can be labeled as informative or non-informative. The image can then be cropped into 21 patches (e.g., images that are 50 pixels by 50 pixels) from the image by translating the image by ten (or any other suitable numbers, such as twenty) percent of a resized bounding box in vertical and horizontal directions. Each resulting patch can be rotated eight times by mirroring and flipping. All 21 patches can then share the same label and the group of these patches is named as one AU.

In some embodiments, a factor f (e.g., where factor $f \in \{1.0, 1.2, 1.5\}$) can be used to enlarge a patch (e.g., to realize an augmented data set of the original size, 1.2 times larger, and 1.5 times larger) and then crop it back to the original size. For example, if one patch is sized at 10 pixels by 10 pixels, it can be enlarged by a factor f equal to 1.2 to produce a patch of 12 pixels by 12 pixels, and then the patch can be cropped to the center 10 pixels by 10 pixels as new a patch after data augmentation.

The manner of performing data augmentation can be based on the application. For example, for colonoscopy frame classification, translation data augmentation can be applied by ten percent of a resized bounding box in vertical and horizontal directions. As another example, for polyp detection, rotation data augmentation can be applied at the center of polyp location. As still another example, for pulmonary embolism detection, scale plus rotation data augmentation can be applied—e.g., by extracting three different physical sizes, e.g., 10 mm, 15 mm, 20 mm wide, by rotating the longitudinal and cross-sectional vessel planes around the vessel axis.

The patches generated from the same AU can be given the same label(s).

As further shown in FIG. 11, the process receives a pre-trained CNN $M_0$. Any suitable pre-trained CNN can be used, and the pre-trained CNN can be received from any suitable source. For example, in some embodiments, the pre-trained CNN be a pre-trained AlexNet, which can have an architecture as described in FIG. 2 in some embodiments.

As other examples, in some embodiments, VGG, GoogleNet, or the ResNet can be used instead of an AlexNet.

As still further shown in FIG. 11, the process can receive a batch size parameter b, a patch selection ratio parameter $\alpha$, and a random extension w. These parameters can have any suitable values. For example, b can be 10, $\alpha$ can be 1/4, and w can be 5.

The outputs of the process shown in FIG. 11 include a set L of labelled AUs and a fine-tuned CNN model at iteration $\tau$. At line 1, the labeled dataset L is initialized to be empty and $\tau$ is initialized to one.

As shown in the figure, in lines 2-19, the process loops until the classification performance of $M_\tau$ is satisfactory. What is satisfactory can be defined in any suitable manner. For example, the classification performance of $M_\tau$ can be determined to be satisfactory when newly annotated samples are mostly predicted by current model correctly.

Between lines 3 and 11, the process can loop through each AU $U_i$ in set D, where $i \in [1, n]$.

A line 4, the process can determine the probabilities of each patch $x_i^j$, where $j \in [1, m]$, in AU $U_i$ corresponding to the |Y| labels by applying CNN $M_{\tau-1}$ to the patches.

Next, at line 5, the process can determine the mean of the probabilities determined at line 4, and, if the mean is greater than 0.5, the process can assign to a set $U_i^\alpha$ the top $\alpha$ percent of the m patches (i.e., the $\alpha$ percent of the m patches having the highest probabilities) of $U_i$ at line 6. Otherwise, if the mean is less than or equal to 0.5, the process can assign to set $U_i^\alpha$ the bottom $\alpha$ percent of the m patches (i.e., the $\alpha$ percent of the m patches having the lowest probabilities) of $U_i$ at line 8.

Then, at line 5, the process can build a quota $R_i$ for AU $U_i$ for $U_i^\alpha$ using the following equation:

$$R_i = \lambda_1 e_i + \lambda_2 d_i$$

where:

$e_i$ represents the entropy of the AU, and can be calculated in some embodiments using $$e_i = -\frac{1}{m} \sum_{k=1}^{|Y|} \sum_{j=1}^{m} p_i^{j,k} \log p_i^{j,k};$$

$d_i$ represents the diversity of the AU, and can be calculated in some embodiments using $$d_i = \sum_{k=1}^{|Y|} \sum_{j=1}^{m} \sum_{l=j}^{m} (p_i^{j,k} - p_i^{l,k}) \log \frac{p_i^{j,k}}{p_i^{l,k}};$$

$\lambda_1$ represents a weighting factor for entropy $e_i$ in $R_i$ and $\lambda_2$ represents a weighting factor for diversity $d_i$ in $R_i$.

In some embodiments, $R_i$ can additionally or alternatively be calculated based on other characteristics of the patches of an AU, such as variance, Gaussian distance, standard deviation, and divergence.

After the process has looped through all of the AUs $U_i$ in D at lines 3-11, the process sorts the AUs $U_i$ in D according to the corresponding values $R_i$ at line 12 to produce D', a sorted list of $U_i$, and R', a sorted list of $R_i$.

At line 13, the process first normalizes the top w*b entries in R' so that they have values between zero and one. Then, at line 13, the process converts the normalized values to sampling probabilities having values between zero and one and adding up to one.

Next, the process queries for labels for the top b candidates of $U_i$ in D' based on the corresponding values in $R^{sel}$ at line 14 to produce a set of labelled candidates Q. This can be performed in any suitable manner. For example, the top b candidates of $U_i$ in D' can be presented to an authorized professional who can manually label each of the top b candidates.

Then, at line 15, the current model $M_{\tau-1}$ can be used to test labeled data L and get predictions p.

At line 16, the predictions p can next be compared with the labels assigned at line 14, the misclassified AUs can be assigned to set H.

Then, at line 17, the CNN $M_{\tau-1}$ can be fine-tuned using the union of sets H and Q to produce new CNN $M_\tau$. The CNN can be fine-tuned in any suitable manner. For example, in some embodiments, an AlexNet CNN can be fine-tuned for different example applications using the learning parameters shown in FIG. 3. In FIG. 3, $\mu$ is the momentum, $\alpha fc8$ is the learning rate of the weights in the last layer, $\alpha$ is the learning rate of the weights in the rest layers, and $\gamma$ determines how $\alpha$ decreases over epochs of the CNN. The learning rate for the bias term can be set to be twice as large as the learning rate of the corresponding weights. $AIFT_1$ indicates the first iteration of the process of FIG. 11 while $AIFT_+$ indicates all the following iterations of the process of FIG. 11.

Then, at line 18, the AUs in Q can be added to the set L and removed from the set D, and $\tau$ can be incremented.

As mentioned above, in lines 2-19, the process loops until the classification performance of $M_\tau$ is satisfactory. What is satisfactory can be defined in any suitable manner. For example, the classification performance of $M_\tau$ can be determined to be satisfactory when newly annotated samples are mostly predicted by current model correctly.

The splendid success of convolutional neural networks (CNNs) in computer vision is largely attributed to the availability of large annotated datasets, but in biomedical imaging it is very challenging to create such large datasets, as annotating biomedical images is not only tedious, laborious, and time consuming, but also demanding of costly, specialty-oriented skills, which are not easily accessible. As described herein, various embodiments dramatically reduce annotation cost by integrating active learning and transfer learning into a single framework by providing: (1) annotation units (AUs) which strike a balance between annotation efficiency and label integrity; (2) a comprehensive analysis of the CNN prediction patterns associated with AUs; (3) four active selection strategies to identify the AUs most effective in boosting the CNN performance; (4) a process (as described in connection with FIG. 11) that starts directly with a pre-trained CNN to seek "salient" AUs for annotation and continuously fine-tuning the (fine-tuned) CNN using newly annotated AUs enlarged with those misclassified AUs; and (5) systematical evaluation of the process in three distinct different applications. In comparison with previous techniques, mechanisms described herein can cut the annotation cost by >95% relative to their training from scratch, >93% relative to full fine-tuning, and >60% relative to random selection. This performance is attributed to the several advantages derived from the advanced active, continuous learning capability the mechanisms.

In some embodiment, alternatively to performing the process in FIG. 11, the process in FIG. 14 can be performed. In some embodiments, any suitable a can be used, such as 0.5, 0.75, etc.

Figure 13:
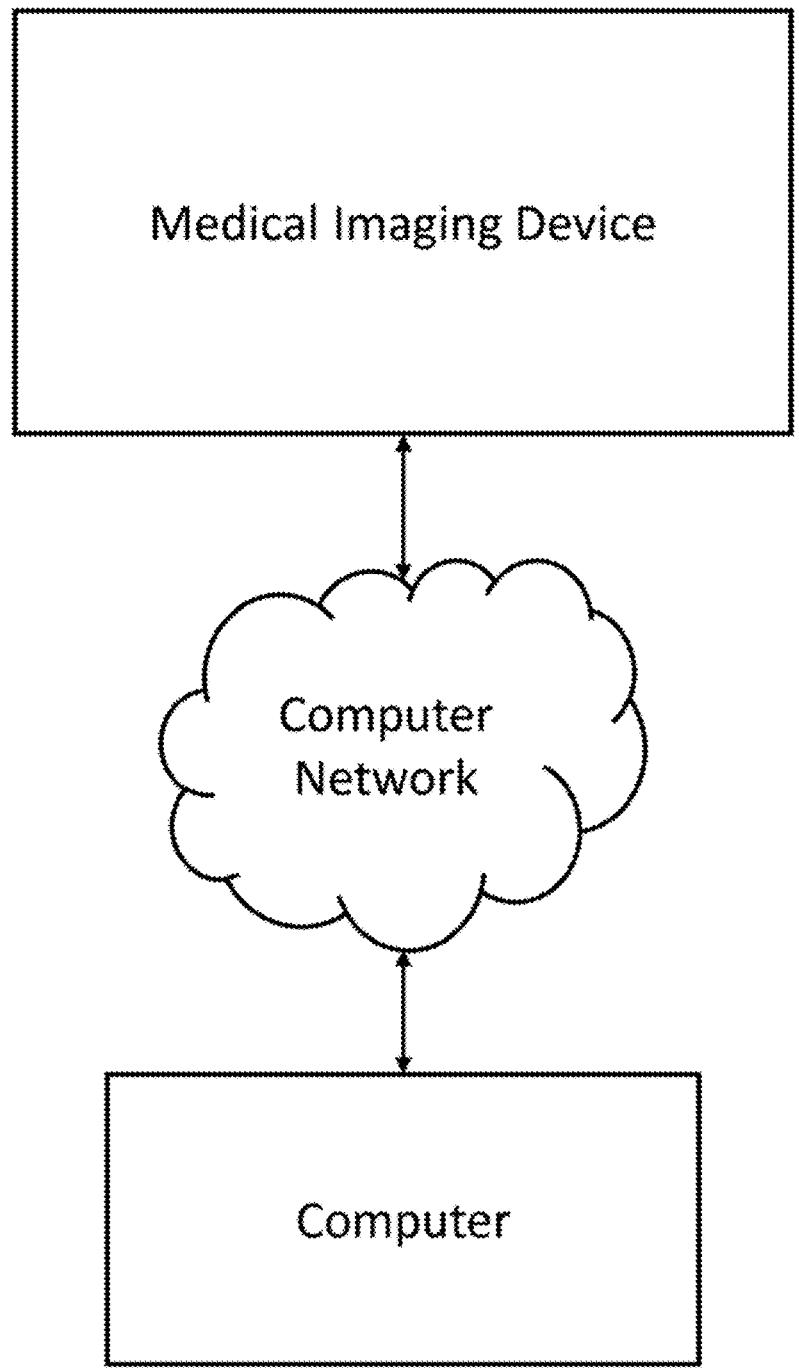
FIG. 13 is an example of hardware that can be used in accordance with some embodiments.

Turning to FIG. 13, an example of hardware that can be used to implement some embodiments is illustrated. As shown, the hardware can include a medical imaging device, a computer network, a computer, and/or any other suitable components. The medical imaging device can be any suitable device for a given application. For example, for colonoscopy frame classification and polyp detection, a colonoscopy machine can be used as the medical imaging device. As another example, for pulmonary embolism detection, CT scanner can be used as the medical imaging device. The computer network can be any suitable computer network for communicating data between the medical imaging device and the computer. For example, the computer network can include a wired network, a wireless network, a local area network, a wide area network, a mobile telephone network, a satellite network, a telephone network, a television network, the Internet, and/or any other suitable network, and each of these networks can include any suitable components such as network interfaces, transmitters, receivers, switches, routers, gateways, buffers, etc. The computer can be any suitable special purpose or general purpose computer. For example, in some embodiments, the computer can include a standard personal computer with a NVIDIA GeForce GTX 960 GPU.

The medical imaging device and/or the computer can each include any suitable components. For example, in some embodiments, each can include one or more hardware processors (e.g., microprocessor(s), microcontroller(s), digital signal processor(s), etc.), one or more memory devices (e.g., RAM, ROM, EPROM, FLASH, static memory, dynamic memory, solid state drive, hard disk, etc.), one or more computer network interfaces (e.g., NIC card), one or more input devices (e.g., mouse, keyboard, light-pen, touch screen, wand sensor, etc.), one or more output devices (e.g., display, speaker, printer, etc.), and/or any other suitable computer device.

Any of the processes described herein can be programmed into any suitable memory devices in the medical imaging device and/or computer and be executed by a hardware processor in the medical imaging device and/or computer.

It should be understood that at least some of the above described steps of the process of FIGS. 1, 5, and 11 can be executed or performed in any order or sequence not limited to the order and sequence shown in and described in the figures. Also, some of the steps of the processes of FIGS. 1, 5, and 11 can be executed or performed substantially simultaneously where appropriate or in parallel to reduce latency and processing times. Additionally or alternatively, some of the above described steps of the processes of FIGS. 1, 5, and 11 can be omitted.

The processes disclosed herein may be implemented by a computer program product. The computer program product may include computer code arranged to instruct a computer to perform the functions of one or more of the various processes described above. The computer program product and/or the code for performing such methods may be provided to an apparatus, such as a computer, on computer-readable media. In some implementations, any suitable computer-readable media can be used for storing instructions for performing the functions and/or processes described herein. For example, in some implementations, computer-readable media can be transitory or non-transitory. For example, non-transitory computer-readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer-readable media can include signals on networks, in wires, conductors, optical fibers, circuits, any suitable media that is fleeting and devoid of any semblance of permanence during transmission, and/or any suitable intangible media.

An apparatus, such as a computer, may be configured in accordance with such code to perform one or more processes in accordance with the various methods discussed herein.

Such an apparatus may take the form of a data processing system. Such a data processing system may be a distributed system. For example, such a data processing system may be distributed across a network.

In another arrangement, a computer-readable medium comprising instructions executable by a processor to perform any one of the various methods disclosed herein is provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for selecting and labeling a Region of Interest (ROI) in an original medical image by fine-tuning a pre-trained convolutional neural network (CNN) using annotated medical images, wherein the system comprises:
   a memory to store instructions;
   a set of one or more hardware processors configured to execute the instructions to cause the system to perform operations including:
   receiving the annotated medical images for use in fine-tuning the pre-trained CNN;
   generating a plurality of input candidates for fine-tuning the pre-trained CNN from the annotated medical images by performing one or more data augmentation operations, each of the plurality of input candidates for use in fine-tuning the pre-trained CNN having multiple identically labeled patches derived from the annotated medical images;
   providing the plurality of input candidates having the plurality of identically labeled patches as input to the pre-trained CNN;
   executing the pre-trained CNN to determine a plurality of probabilities for each of the plurality of input candidates, wherein each of the plurality of probabilities define a likelihood that a unique patch amongst the plurality of identically labeled patches of the respective input candidate corresponds to a label associated with annotations for the annotated medical images from which the respective input candidate was derived;
   determining an entropy value for each of the plurality of input candidates based on the plurality of probabilities of the corresponding input candidate;
   sorting the plurality of input candidates according to their respective entropy value;
   identifying a subset of top-ranked input candidates amongst the sorted plurality of input candidates, wherein the subset does not include all of the plurality of input candidates;
   labeling the subset of top-ranked input candidates to produce labeled candidates;
   fine-tuning the pre-trained CNN using the labeled candidates to produce a trained CNN; and
   selecting and labeling the ROI within the original medical image and identifying via the trained CNN a location for the ROI within the original medical image using an ROI object confidence map produced by the trained CNN, wherein the location of the ROI is determined by identifying a largest connected object in the original medical image which is connected to an identified object within the ROI object confidence map based on at least one pixel of an object in the original medical image falling within the ROI; and
   returning as output, the selected and labeled ROI for the original medical image.

2. The system of claim 1, wherein the set of one or more hardware processors is further configured to execute the instructions to cause the system to perform operations including:
   determining an average of the plurality of probabilities for each of the plurality of candidates; and
   select a top percentage of the plurality of identically labeled patches for a candidate when the average is greater than a threshold.

3. The system of claim 1, wherein the one or more data augmentation operations comprise:
   (i) cropping the annotated medical image into multiple parts, each cropped part having a label based on the annotated medical image, (ii) translating each cropped part into a group of multiple identically labeled patches sharing a same label, and (iii) naming each respective group of multiple identically labeled patches as one of the plurality of input candidates for use in training the CNN.

4. The system of claim 1:
   wherein identifying the largest connected object in the original medical image which is connected to the identified object within the ROI object confidence map comprises executing an indicator function;
   wherein the indicator function excludes all pixels located farther than a threshold distance from a location of the object in the original medical image; and
   wherein the at least one pixel of the object within the original medical image falling within the ROI comprises the at least one pixel falling within the threshold distance from the location of the object in the original medical image.

5. The system of claim 1, wherein
   entropy for each of the plurality of input candidates based on the plurality of probabilities of the corresponding input candidate
   comprises determining the entropy $\varepsilon_i$ of the corresponding candidate i using the following equation:

$$\varepsilon_i = -\frac{1}{m}\sum_{j=1}^{m}\sum_{k=1}^{|Y|}p_i^{j,k}\log p_i^{j,k}$$

where:
   m is the number of patches for the corresponding candidate;
   |Y| is the number of possible labels; and
   $p_i^{j,k}$ is the probability that patch j candidate i corresponds to label k.

6. The system of claim 1:
wherein the original medical image forms no part of the annotated medical images used for fine-tuning the pre-trained CNN;
wherein the ROI object confidence map comprises an ROI and bulb confidence map identifying the object in the original medical image; and
wherein the object in the original medical image comprises a carotid bulb selected and labeled within the ROI.

7. The system of claim 1, wherein the set of one or more hardware processors is also configured to execute the instructions to cause the system to perform the operations including:
determining a diversity value d, for each of the plurality of input candidates based on the plurality of probabilities of the corresponding input candidate;
wherein sorting the plurality of input candidates according to their respective entropy value comprises sorting the plurality of input candidates further according to their respective diversity value; and
wherein the diversity value $d_i$ for a corresponding input candidate i is calculated using the following equation:

$$d_i = \sum_{k=1}^{|Y|} \sum_{j=1}^{m} \sum_{l=j}^{m} (p_i^{j,k} - p_i^{l,k}) \log \frac{p_i^{j,k}}{p_i^{l,k}};$$

where:
m is the number of patches for the corresponding candidate;
|Y| is the number of possible labels;
$p_i^{j,k}$ is the probability that patch j candidate i corresponds to label k; and
$p_i^{l,k}$ is the probability that patch l candidate i corresponds to label k.

8. The system of claim 1, wherein the subset of top-ranked input candidates are misclassified candidates.

9. The system of claim 1, wherein the set of one or more hardware processors is also configured to form a set of labeled candidates from previously labeled candidates and the labeled candidates produced in response to a query.

10. The system of claim 1:
wherein each one of the plurality of input candidates constitutes a single Annotation Unit (AU); and
wherein the method further comprises labeling the entirety of each single AU as either informative or non-informative.

11. The system of claim 1, wherein translating each cropped part into the group of multiple identically labeled patches comprises at least one of:
(i) enlarging each cropped part into a larger patch when compared with an original size for the cropped part and re-cropping the larger patch back to the original size to yield a new patch as part of performing the data augmentation operation;
(ii) increasing a pixel size of each cropped part to form an increased pixel size patch when compared with an original size for the cropped part and re-cropping the increased pixel size patch to a centered pre-defined quantity of pixels as a new patch after performing the data augmentation operation;
(iii) applying a configurable percentage of a resized bounding box to each cropped part in vertical and horizontal directions to yield a new patch as part of performing the data augmentation operation;
(iv) applying a rotation based data augmentation operation at an identified center of a polyp location within one of the cropped parts to yield a new patch as part of performing the data augmentation operation;
(v) applying a rotation-plus-scale based data augmentation operation by extracting multiple different physical sizes from one of the cropped parts and by further rotating longitudinal and cross-sectional vessel planes around a vessel axis to yield a new patch as part of performing the data augmentation operation; and
(vi) rotating one of the cropped parts eight times by mirroring and flipping the respective cropped part into mirrored and flipped translations to yield new patches as part of performing the data augmentation operation.

12. A method for selecting and labeling a Region of Interest (ROI) in an original medical image by fine-tuning a pre-trained convolutional neural network (CNN) using annotated medical images, wherein the method comprises:
receiving the annotated medical images for use in fine-tuning the pre-trained CNN;
generating a plurality of input candidates for fine-tuning the pre-trained CNN from the annotated medical images by performing one or more data augmentation operations, each of the plurality of input candidates for use in fine-tuning the pre-trained CNN having multiple identically labeled patches derived from the annotated medical images;
providing the plurality of input candidates having the plurality of identically labeled patches as input to the pre-trained CNN;
executing the pre-trained CNN to determine a plurality of probabilities for each of the plurality of input candidates, wherein each of the plurality of probabilities define a likelihood that a unique patch amongst the plurality of identically labeled patches of the respective input candidate corresponds to a label associated with annotations for the annotated medical images from which the respective input candidate was derived;
determining an entropy value for each of the plurality of input candidates based of the plurality of probabilities of the corresponding input candidate;
sorting the plurality of input candidates ding to their respective entropy value;
identifying a subset of top-ranked input candidates amongst the sorted plurality of input candidates, wherein the subset does not include all of the plurality of input candidates;
labeling the subset of top-ranked input candidates to produce labeled candidates;
fine-tuning the pre-trained CNN using the labeled candidates to produce a trained CNN; and
selecting and labeling the ROI within the original medical image and identifying via the trained CNN a location for the ROI within the original medical image using an ROI object confidence map produced by the trained CNN, wherein the location of the ROI is determined by identifying a largest connected object in the original medical image which is connected to an identified object within the ROI object confidence map based on at least one pixel of an object in the original medical image falling within the ROI; and
returning as output, the selected and labeled ROI for the original medical image.

13. The method of claim 12, further comprising:
determining an average of the plurality of probabilities for each of the plurality of candidates; and selecting a top percentage of the plurality of identically labeled patches for a candidate when the average is greater than a threshold.

14. The method of claim 12, wherein the entropy $\varepsilon_i$ of for the corresponding input candidate i is determined using the following equation:

$$\varepsilon_i = -\frac{1}{m}\sum_{j=1}^{m}\sum_{k=1}^{|Y|} p_i^{j,k} \log p_i^{j,k}$$

where:
m is the number of patches for the corresponding candidate;
|Y| is the number of possible labels; and
$p_i^{j,k}$ is the probability that patch j candidate i corresponds to label k.

15. The method of claim 12:
wherein identifying the largest connected object in the original medical image which is connected to the identified object within the ROI object confidence map comprises executing an indicator function;
wherein the indicator function excludes all pixels located farther than a threshold distance from a location of the object in the original medical image; and
wherein the at least one pixel of the object within the original medical image falling within the ROI comprises the at least one pixel falling within the threshold distance from the location of the object in the original medical image.

16. The method of claim 12:
wherein the original medical image forms no part of the annotated medical images used for fine-tuning the pre-trained CNN;
wherein the ROI object confidence map comprises an ROI and bulb confidence map identifying the object within in the original medical image; and
wherein the object in the original medical image comprises a carotid bulb selected and labeled within the ROI.

17. The method of claim 12, further comprising:
determining a diversity value $d_i$ for each of the plurality of input candidates based on the plurality of probabilities of the corresponding input candidate;
wherein sorting the plurality of input candidates cording to their respective entropy value comprises sorting the plurality of input candidates further according to their respective diversity value; and
wherein the diversity value $d_i$ for a corresponding input candidate i is determined using the following equation:

$$d_i = \sum_{k=1}^{|Y|}\sum_{j=1}^{m}\sum_{l=j}^{m}(p_i^{j,k} - p_i^{l,k})\log\frac{p_i^{j,k}}{p_i^{l,k}};$$

where:
m is the number of patches for the corresponding candidate;
|Y| is the number of possible labels;
$p_i^{j,k}$ is the probability that patch j candidate i corresponds to label k; and
$p_i^{l,k}$ is the probability that patch l candidate i corresponds to label k.

18. The method of claim 12, wherein the subset of top-ranked input candidates are misclassified candidates.

19. The method of claim 12, further comprising forming a set of labeled candidates from previously labeled candidates and the labeled candidates produced in response to a query.

20. Non-transitory computer readable storage media having instructions stored thereupon that, when executed by a processor and a memory of a system, the instructions cause the system to perform operations comprising:
receiving annotated medical images for use in fine-tuning a pre-trained CNN;
generating a plurality of input candidates for fine-tuning the pre-trained CNN from the annotated medical images by performing one or more data augmentation operations, each of the plurality of input candidates for use in fine-tuning the pre-trained CNN having multiple identically labeled patches derived from the annotated medical images;
providing the plurality of input candidates having the plurality of identically labeled patches as input to the pre-trained CNN;
executing the pre-trained CNN to determine a plurality of probabilities for each of the plurality of input candidates, wherein each of the plurality of probabilities define a likelihood that a unique patch amongst the plurality of identically labeled patches of the respective input candidate corresponds to a label associated with annotations for the annotated medical images from which the respective input candidate was derived;
determining an entropy value for each of the plurality of input candidates based on the plurality of probabilities of the corresponding input candidate;
sorting the plurality of input candidates according to their respective entropy value;
identifying a subset of top-ranked input candidates amongst the sorted plurality of input candidates, wherein the subset does not include all of the plurality of input candidates;
labeling the subset of top-ranked input candidates to produce labeled candidates;
fine-tuning the pre-trained CNN using the labeled candidates to produce a trained CNN; and
selecting and labeling a region of interest (ROI) within the annotated medical images and identifying via the trained CNN a location for the ROI within the annotated medical images using an ROI object confidence map produced by the trained CNN, wherein the location of the ROI is determined by identifying a largest connected object in the annotated medical images which is connected to an identified object within the ROI object confidence map based on at least one pixel of an object in the annotated medical images falling within the ROI; and
returning as output, the selected and labeled ROI for the annotated medical images.

* * * * *